(12) United States Patent
Hwang et al.

(10) Patent No.: US 11,838,863 B2
(45) Date of Patent: *Dec. 5, 2023

(54) METHOD FOR MONITORING DOWNLINK CHANNEL OR DOWNLINK SIGNAL, AND WIRELESS DEVICE

(71) Applicant: LG Electronics Inc., Seoul (KR)

(72) Inventors: Seunggye Hwang, Seoul (KR); Changhwan Park, Seoul (KR); Joonkui Ahn, Seoul (KR); Sukhyon Yoon, Seoul (KR); Suckchel Yang, Seoul (KR); Seonwook Kim, Seoul (KR); Seokmin Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/891,422

(22) Filed: Aug. 19, 2022

(65) Prior Publication Data

US 2022/0394614 A1 Dec. 8, 2022

Related U.S. Application Data

(63) Continuation of application No. 16/650,718, filed as application No. PCT/KR2018/011135 on Sep. 20, 2018, now Pat. No. 11,477,731.

(Continued)

(30) Foreign Application Priority Data

| Apr. 5, 2018 | (KR) | .................. | 10-2018-0039833 |
| May 10, 2018 | (KR) | .................. | 10-2018-0053919 |
| Aug. 8, 2018 | (KR) | .................. | 10-2018-0092147 |

(51) Int. Cl.
*H04W 52/02* (2009.01)
*H04W 76/38* (2018.01)
*H04W 72/1273* (2023.01)

(52) U.S. Cl.
CPC ... *H04W 52/0216* (2013.01); *H04W 52/0229* (2013.01); *H04W 72/1273* (2013.01); *H04W 76/38* (2018.02)

(58) Field of Classification Search
CPC ......... H04W 52/0216; H04W 52/0229; H04W 72/1273; H04W 76/38; H04W 76/28; Y02D 30/70

See application file for complete search history.

(56) References Cited

U.S. PATENT DOCUMENTS

| 2009/0310503 A1 | 12/2009 | Tenny et al. |
| 2012/0275366 A1 | 11/2012 | Anderson et al. |

(Continued)

FOREIGN PATENT DOCUMENTS

| WO | WO2016/146147 | 9/2016 |

OTHER PUBLICATIONS

Extended European Search Report in European Appln. No. 18858418. 9, dated Jun. 23, 2021, 9 pages.

(Continued)

*Primary Examiner* — Ricardo H Castaneyra
(74) *Attorney, Agent, or Firm* — Fish & Richardson P.C.

(57) ABSTRACT

The present disclosure relates to a method of monitoring, by a wireless device, a downlink channel or a downlink signal. The method may include a step of receiving configuration information on a power save signal. The power saving signal can be used to signal that the downlink channel or the downlink signal should be monitored later. The configuration information may contain configuration information on an opportunity to omit the power saving signal. The method may include a step of monitoring the downlink channel or the downlink signal without monitoring the energy saving signal during the opportunity to omit. The length and/or position of the opportunity of omission can be determined according to the configuration information of a discontinuous receive cycle (DRX).

18 Claims, 26 Drawing Sheets

Related U.S. Application Data

(60) Provisional application No. 62/562,505, filed on Sep. 25, 2017, provisional application No. 62/586,209, filed on Nov. 15, 2017, provisional application No. 62/586,212, filed on Nov. 15, 2017, provisional application No. 62/587,440, filed on Nov. 16, 2017, provisional application No. 62/591,201, filed on Nov. 28, 2017, provisional application No. 62/626,633, filed on Feb. 5, 2018.

(56) References Cited

U.S. PATENT DOCUMENTS

| | | |
|---|---|---|
| 2013/0210420 A1 | 8/2013 | Deivasigamani et al. |
| 2014/0016614 A1 | 1/2014 | Velev et al. |
| 2015/0126206 A1 | 5/2015 | Krishnamurthy et al. |
| 2015/0215989 A1 | 7/2015 | Bangolae et al. |
| 2016/0142974 A1 | 5/2016 | Lindoff et al. |
| 2016/0212708 A1 | 7/2016 | Kim et al. |
| 2018/0146430 A1 | 5/2018 | Yadav et al. |
| 2018/0176883 A1 | 6/2018 | Fujishiro et al. |

OTHER PUBLICATIONS

Guangdong OPPO Mobile Telecom, "Considerations on the DL power consumption reduction for feNB-IoT," R1-1713258, 3GPP TSG RAN WG1 Meeting #90, Prague, Czech Republic, dated Aug. 21-25, 2017, 5 pages.

Huawei, HiSilicon, "On power-saving signal for eFeMTC," R1-1712106, 3GPP TSG RAN WG1 Meeting #90, Prague, Czech Republic, dated Aug. 21-25, 2017, 8 pages.

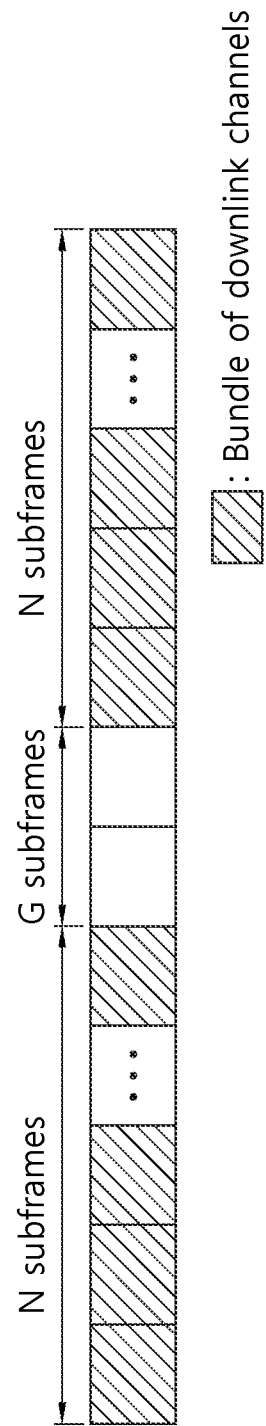

METHOD FOR MONITORING DOWNLINK CHANNEL OR DOWNLINK SIGNAL, AND WIRELESS DEVICE

CROSS-REFERENCE TO RELATED APPLICATIONS

This application is a continuation of U.S. application Ser. No. 16/650,718, filed on Mar. 25, 2020, which is a National Stage application under 35 U.S.C. § 371 of International Application No. PCT/KR2018/011135, filed on Sep. 20, 2018, which claims the benefit of U.S. Provisional Applications No. 62/562,505 filed on Sep. 25, 2017, No. 62/586,209 filed on Nov. 15, 2017, No. 62/586,212 filed on Nov. 15, 2017, No. 62/587,440 filed on Nov. 16, 2017, No. 62/591,201 filed on Nov. 28, 2017, No. 62/626,633 filed on Feb. 5, 2018 and Korean Patent Applications No. 10-2018-0039833 filed on Apr. 5, 2018, No. 10-2018-0053919 filed on May 10, 2018, No. 10-2018-0092147 filed on Aug. 8, 2018. The disclosures of the prior applications are incorporated by reference in their entirety.

BACKGROUND OF THE DISCLOSURE

Field of the Disclosure

The present disclosure relates to mobile communication

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

A physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, recently, Internet of Things (IoT) communication has been attracted. The IoT refers to communications that do not involve human interaction. A discussion is beginning to be made to accommodate such IoT communications in a cellular-based LTE system.

However, since the existing LTE system has been designed for the purpose of supporting high-speed data communication, it has been regarded as an expensive communication method.

However, IoT communication can be widely used only if the price is low due to its characteristics.

Thus, there have been discussions to reduce bandwidth as part of cost savings. This is referred to as a NB (narrow band) IoT.

A common UE blind-decodes a PDCCH in an on occasion according to discontinuous reception (DRX). However, in the case of an NB-IoT device, the transmission and reception of data may not be frequent in terms of its characteristic. Accordingly, to frequently monitor a PDCCH even in an on occasion according to DRX may be inefficient.

SUMMARY OF THE DISCLOSURE

Accordingly, a disclosure of the present specification has been made in an effort to solve the aforementioned problem.

Specifically, a disclosure of this specification is to propose a method capable of maximizing energy efficiency of an NB-IoT device.

One disclosure of this specification provides a method of monitoring a downlink channel or downlink signal. The method may be performed by a wireless device and include receiving configuration information for a power saving signal. The power saving signal may be used to notify that the downlink channel or downlink signal needs to be subsequently monitored. The configuration information may include configuration information for the skip occasion of the power saving signal. The method may include monitoring the downlink channel or downlink signal without monitoring the power saving signal during the skip occasion. One or more of the length and location of the skip occasion may be determined based on configuration information of a discontinuous reception (DRX) cycle.

The one or more of the length and location of the skip occasion may be determined based on N times the length of the DRX cycle.

The length of the skip occasion may be represented as a system frame number (SFN).

The configuration information for the power saving signal may include information for an expired timer.

The method may further include driving the expired timer in an occasion other than the skip occasion.

The method may further include subsequently monitoring the downlink channel or the downlink signal when the power saving signal may be not received until the expired timer expires in the occasion other than the skip occasion.

The expired timer may be initiated in relation to the release of a radio resource control (RRC) connection.

The release of the RRC connection may be performed based on the reception of a downlink control channel or a downlink data channel.

The release of the RRC connection may be performed based on the transmission of an uplink control channel or an uplink data channel.

The expired timer may be driven based on an SFN.

One disclosure of this specification provides a wireless device monitoring a downlink channel or a downlink signal. The wireless device may include a transceiver unit and a processor configured to receive configuration information for a power saving signal by controlling the transceiver unit. The power saving signal may be used to notify that the downlink channel or downlink signal needs to be subsequently monitored.

The configuration information may include configuration information for a skip occasion of the power saving signal. The processor may monitor the downlink channel or the downlink signal without the monitoring of the power saving signal during the skip occasion. One or more of the length and location of the skip occasion may be determined based on configuration information of a discontinuous reception (DRX) cycle.

According to the disclosure of the present disclosure, the problem of the conventional technology described above may be solved.

BRIEF DESCRIPTION OF THE DRAWINGS

FIG. 5C illustrates an example of transmitting a bundle of downlink channels.

DESCRIPTION OF EXEMPLARY EMBODIMENTS

Figure 1:
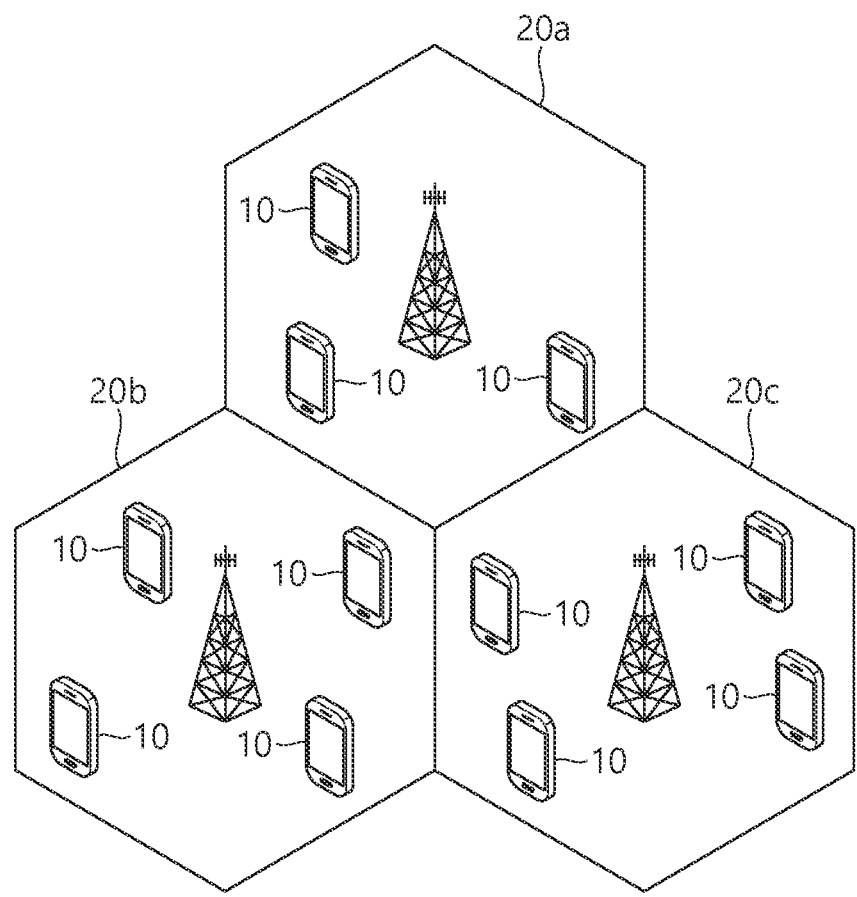
FIG. 1 is a wireless communication system.

Hereinafter, based on 3rd Generation Partnership Project (3GPP) long term evolution (LTE) or 3GPP LTE-advanced (LTE-A), the present disclosure will be applied. This is just an example, and the present disclosure may be applied to various wireless communication systems. Hereinafter, LTE includes LTE and/or LTE-A.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
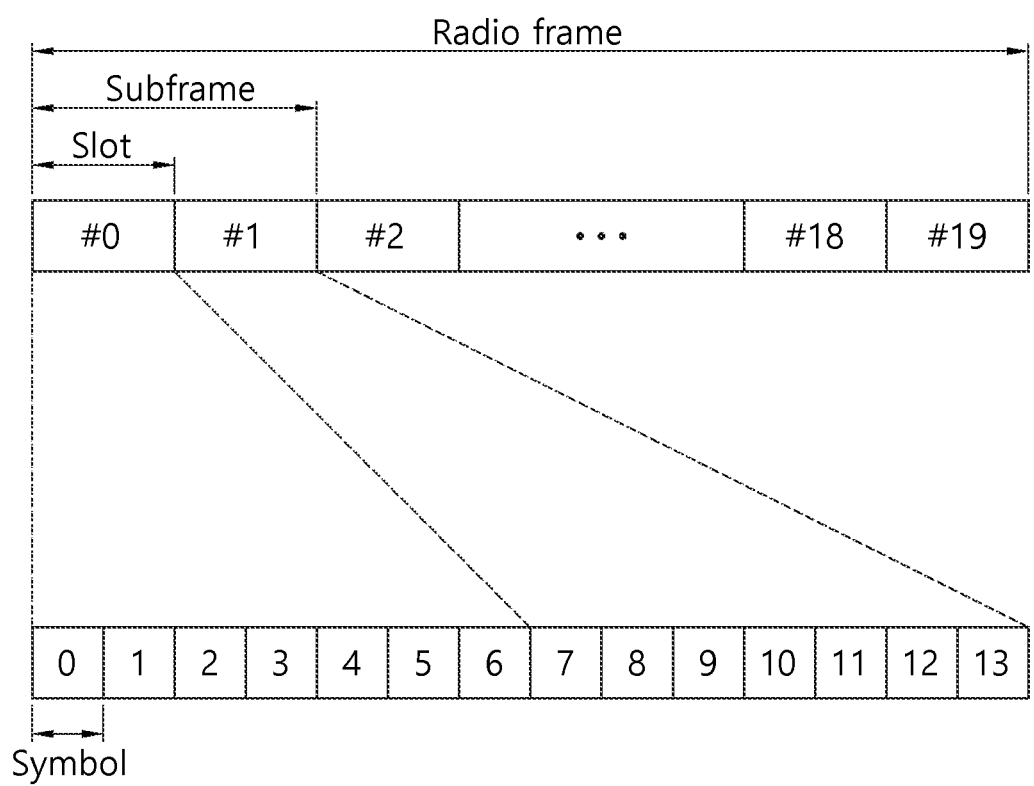
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

One slot includes $N_{RB}$ resource blocks (RBs) in the frequency domain. For example, in the LTE system, the number of resource blocks (RBs), i.e., $N_{RB}$, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

Figure 3:
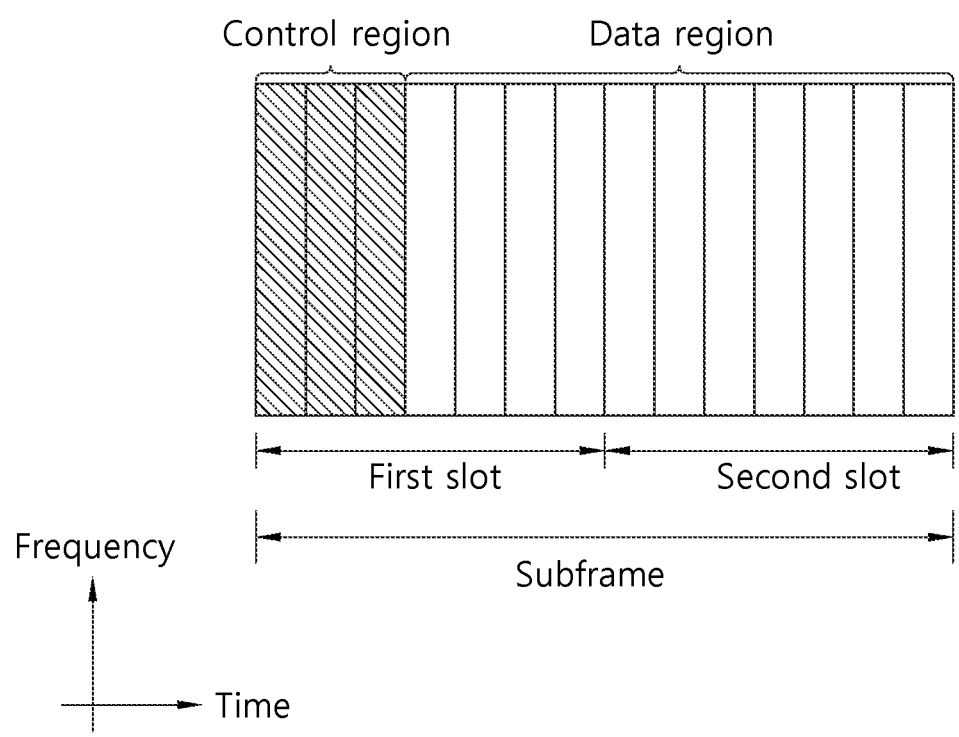
FIG. 3 illustrates the architecture of a downlink subframe.

FIG. 3 illustrates the architecture of a downlink subframe.

In FIG. 3, assuming the normal CP, one slot includes seven OFDM symbols, by way of example.

The DL (downlink) subframe is split into a control region and a data region in the time domain. The control region includes up to first three OFDM symbols in the first slot of the subframe. However, the number of OFDM symbols included in the control region may be changed. A PDCCH (physical downlink control channel) and other control channels are assigned to the control region, and a PDSCH is assigned to the data region.

A PCFICH that is transmitted in the first OFDM symbol of a subframe carries a Control Format Indicator (CFI) regarding the number of OFDM symbols (i.e., the size of a control region) used to transmit control channels within the subframe. A wireless device first receives a CFI on a PCFICH and then monitors PDCCHs.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

<Discontinuous Reception (DRX)>

Hereinafter, discontinuous reception (DRX) in 3GPP LTE will be described.

The DRX allows a terminal to monitor a downlink channel discontinuously in order to reduce battery consumption of a radio device.

Figure 4:
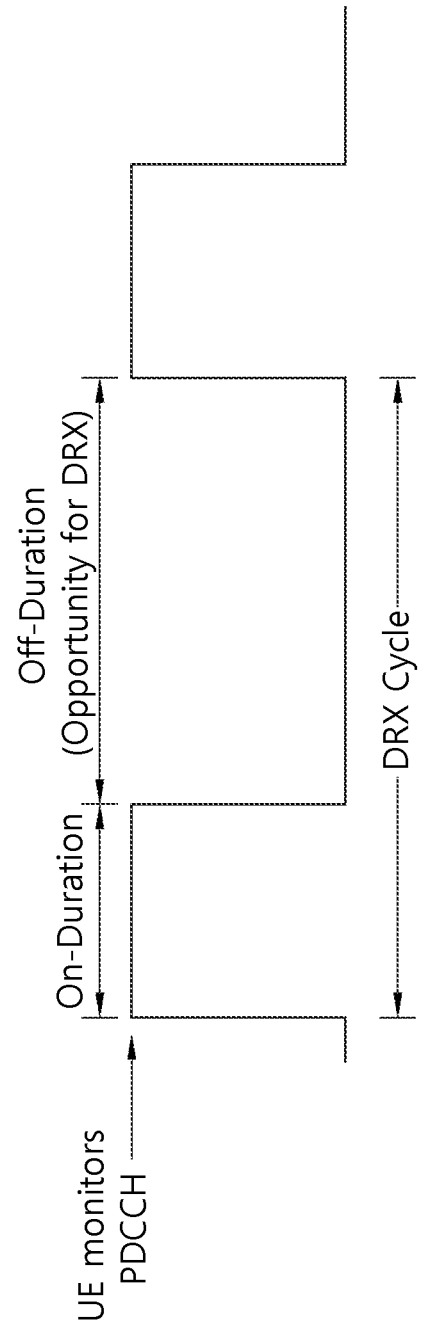
FIG. 4 illustrates an example of a DRX cycle.

FIG. 4 illustrates an example of a DRX cycle.

A DRX cycle specifies periodic repetition of On Duration followed by a possible period of inactivity. The DRX cycle includes On Duration and Off Duration. On Duration is a period of time in which a UE monitors a PDCCH in a DRX cycle.

Once DRX is set, a UE may monitor a PDCCH during On Duration but may not monitor a PDCCH during Off Duration.

To define On Duration, an onDuration timer is used. The On Duration may be defined as a period in which the onDuration timer is being operated. The onDuration timer specifies the number of consecutive PDCCH-subframe(s) at the beginning of the DRX cycle. A PDCCH-subframe indicates a subframe that is monitored by a PDCCH.

In addition to a DRX cycle, other periods in which a PDCCH is monitored may be defined. A time duration during which a PDCCH is monitored is collectively referred to Active time. The Active time may consist of an On Duration during which an UE periodically monitors the PDCCH, and a time duration during which the UE monitors the PDCCH upon occurrence of an event.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provided an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Internet of Things (IoT) Communication>

Hereinafter, the IoT will be described.

Figure 5A:
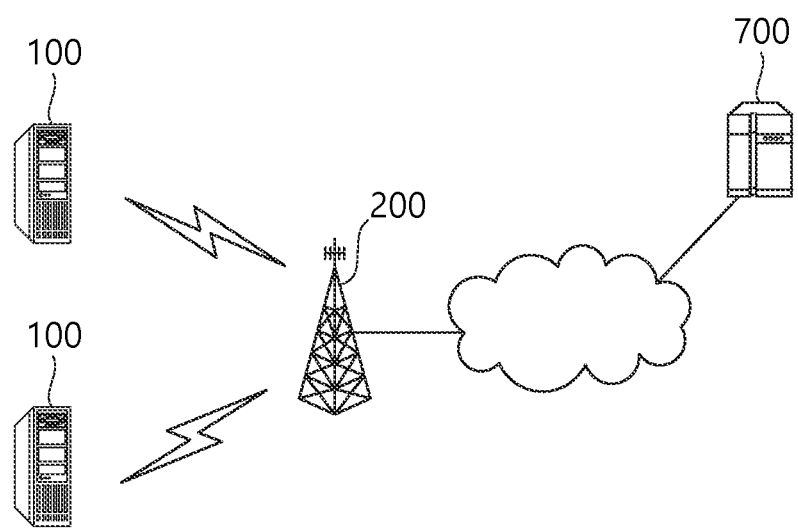
FIG. 5A illustrates an example of IoT (Internet of Things) communication.

FIG. 5A illustrates an example of IoT (Internet of Things) communication.

The IoT refers to information exchange between the IoT devices 100 without human interaction through the base station 200 or information exchange between the IoT device 100 and the server 700 through the base station 200. In this way, the IoT communication may be also referred to as Cellular Internet of Things (CIoT) in that it communicates with a cellular base station.

Such IoT communication is a type of machine-type communication (MTC). Therefore, the IoT device may be referred to as an MTC device.

The IoT service is distinct from the service in the conventional human intervention communication and may include various categories of services such as tracking, metering, payment, medical service, and remote control. For example, the IoT services may include meter reading, water level measurement, use of surveillance cameras, inventory reporting of vending machines, and so on.

Since the IoT communication has a small amount of data to be transmitted and uplink or downlink data transmission and reception rarely occur, it is desirable to lower the cost of the IoT device 100 and reduce battery consumption depending on a low data rate. Further, since the IoT device 100 has low mobility characteristics, the IoT device 100 has characteristics that the channel environment changes little.

Figure 5B:
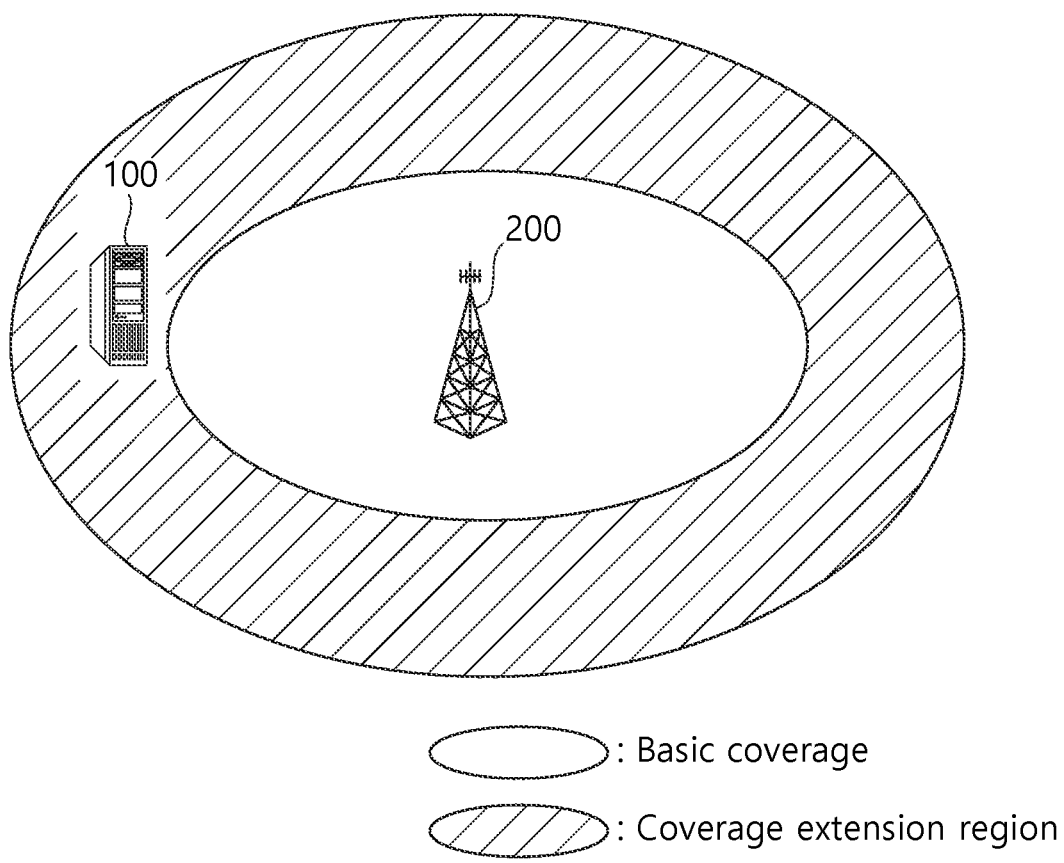
FIG. 5B is an illustration of cell coverage expansion or augmentation for an IoT device.

FIG. 5B is an illustration of cell coverage extension or enhancement for an IoT device.

Recently, extending or enhancing the cell coverage of the base station for the IoT device 100 has been considered, and various techniques for extending or enhancing the cell coverage have been discussed.

However, when the coverage of the cell is extended or enhanced, if the base station transmits a downlink channel to the IoT device located in the coverage extension (CE) or coverage enhancement (CE) region, then the IoT device has difficulty in receiving it. Similarly, when an IoT device located in the CE region transmits an uplink channel, the base station has difficulty in receiving it.

In order to solve this problem, a downlink channel or an uplink channel may be repeatedly transmitted over multiple subframes. Repeating the uplink/downlink channels on multiple subframes is referred to as bundle transmission.

FIG. 5C illustrates an example of transmitting a bundle of downlink channels.

As illustrated in FIG. 5C, a base station repeatedly transmits a downlink channel (e.g., a PDCCH and/or a PDSCH) to an IoT device 100 located in a CE region on a plurality of subframes (e.g., N subframes).

The IoT device or the base station receives a bundle of downlink/uplink channels on a plurality of subframes and decodes a portion of the bundle or the entire bundle, thereby increasing the decoding success rate.

Figure 6A:
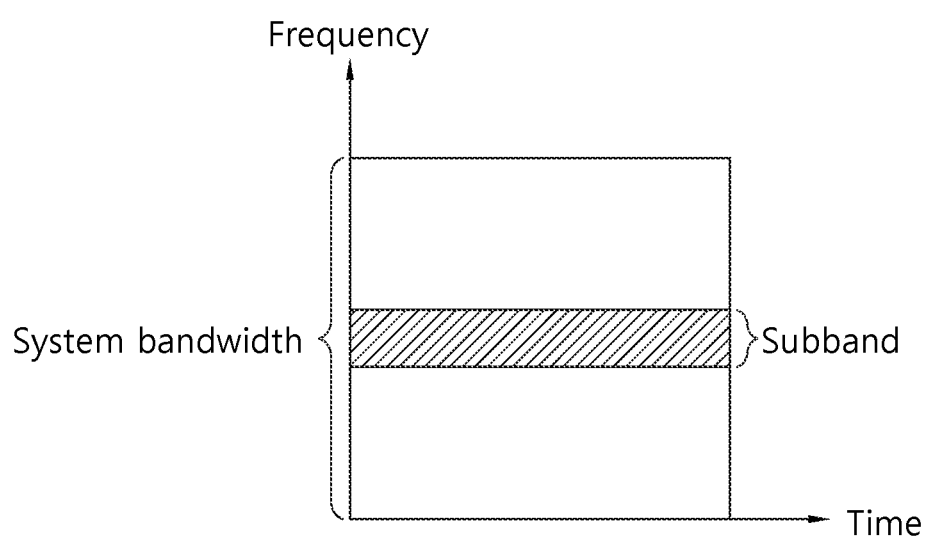
FIGS. 6A and 6B are diagrams illustrating examples of sub-bands in which IoT devices operate.
Figure 6B:
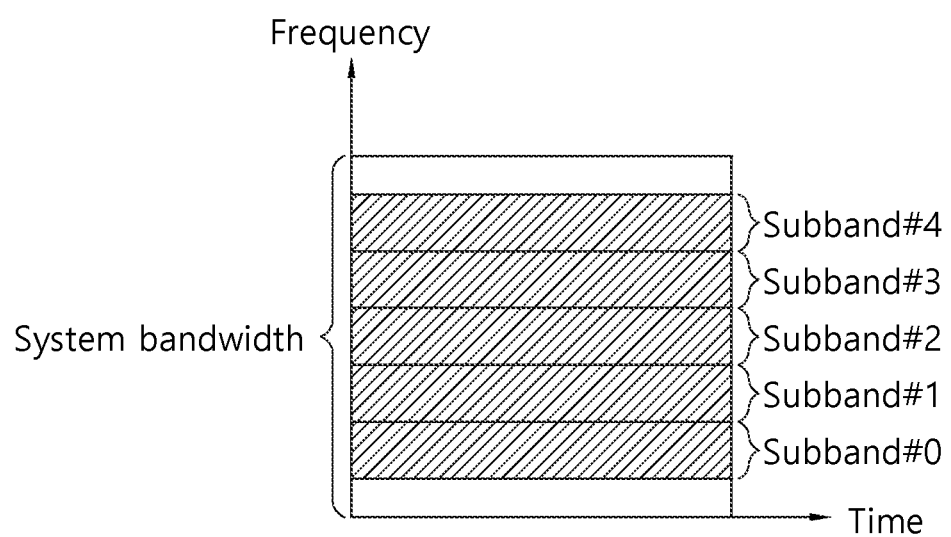

FIGS. 6A and 6B are diagrams illustrating examples of sub-bands in which IoT devices operate.

As one method for low-cost IoT devices, regardless of the system bandwidth of the cell as shown in FIG. 5A, the IoT device may use a sub-band of about 1.4 MHz for example.

In this case, an area of the subband in which the IoT device operates may be positioned in a central region (e.g., six middle PRBs) of the system bandwidth of the cell as shown in FIG. 5A.

Alternatively, as shown in FIG. 5B, a plurality of sub-bands of the IoT device may be used in one sub-frame for intra-subframe multiplexing between IoT devices to use different sub-bands between IoT devices. In this case, the majority of IoT devices may use sub-bands other than the central region of the system band of the cell (e.g., six middle PRBs).

The IoT communication operating on such a reduced bandwidth can be called NB (Narrow Band) IoT communication or NB CIoT communication.

Figure 7:
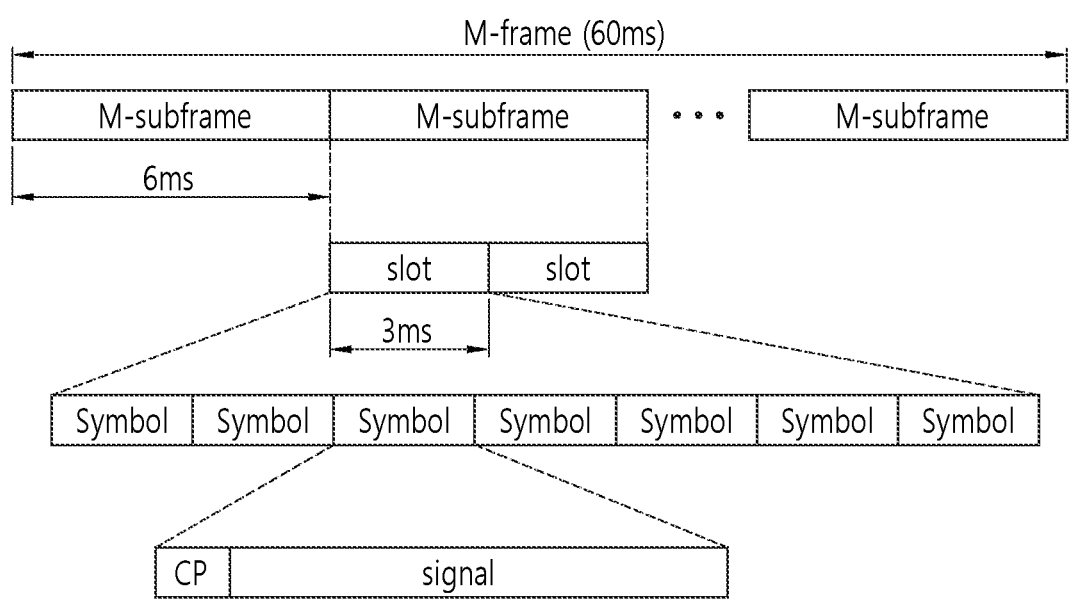
FIG. 7 illustrates an example of time resources that can be used for NB-IoT in M-frame units.

FIG. 7 illustrates an example of time resources that can be used for NB-IoT in M-frame units.

Referring to FIG. 7, a frame that may be used for the NB-IoT may be referred to as an M-frame, and the length may be illustratively 60 ms. Also, a subframe that may be used for the NB IoT may be referred to as an M-subframe, and the length may be illustratively 6 ms. Thus, an M-frame may include 10 M-subframes.

Each M-subframe may include two slots, and each slot may be illustratively 3 ms.

However, unlike what is shown in FIG. 7, a slot that may be used for the NB IoT may have a length of 2 ms, and thus the subframe has a length of 4 ms and the frame may have a length of 40 ms. This will be described in more detail with reference to FIG. 7.

Figure 8:
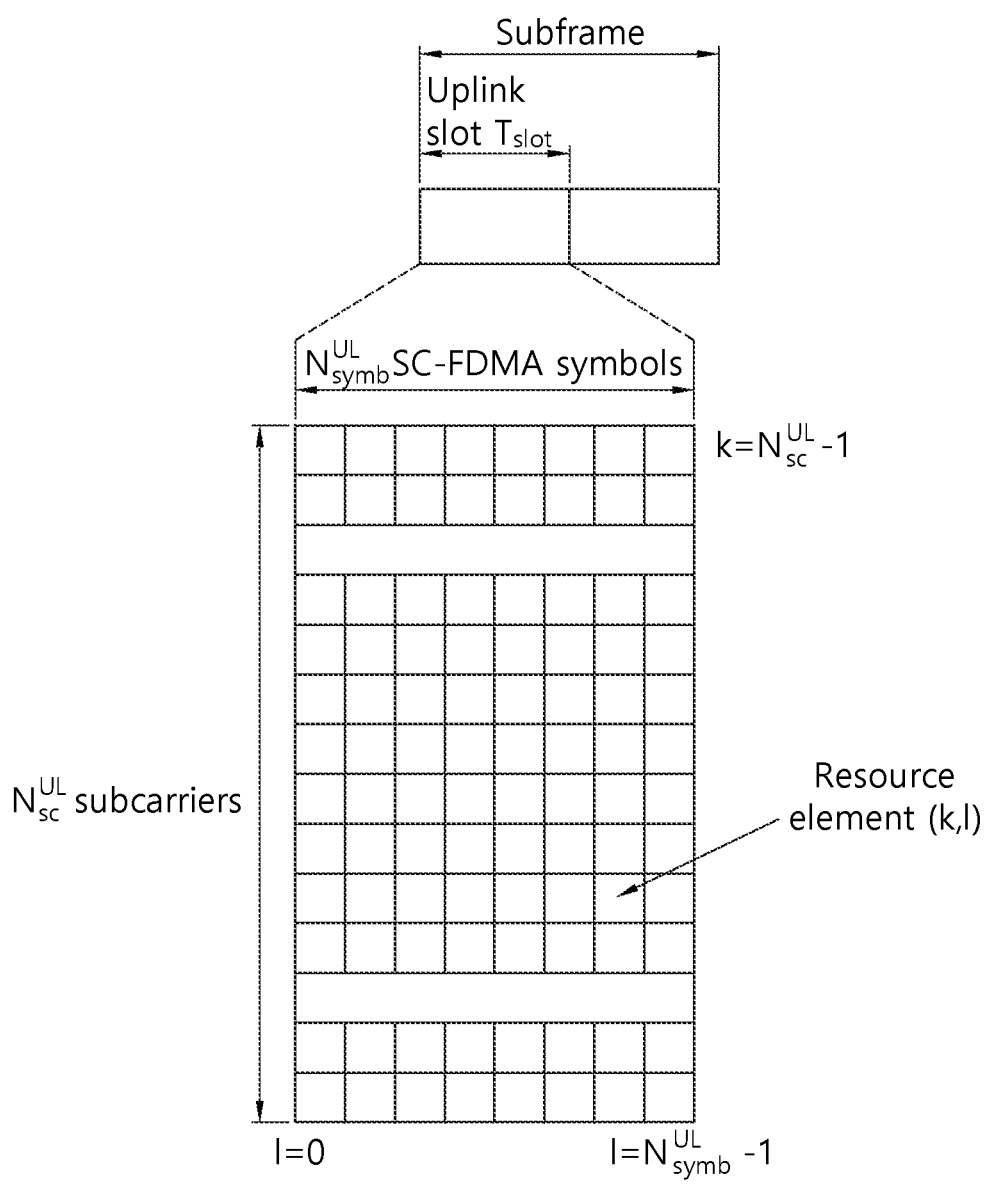
FIG. 8 is another illustration representing time resources and frequency resources that can be used for NB IoT.

FIG. 8 illustrates another example of time resources and frequency resources that can be used for NB IoT.

Referring to FIG. 8, a physical channel or a physical signal transmitted on a slot in an NB-IoT uplink includes $N_{symb}^{UL}$ SC-FDMA symbols in the time domain and $N_{sc}^{UL}$ subcarriers in the frequency domain. The uplink physical channel may be divided into a narrowband physical uplink shared channel (NPUSCH) and a narrowband physical random access channel (NPRACH). In NB-IoT, the physical signal may be a narrowband demodulation reference signal (NDMRS).

In NB-IoT, an uplink bandwidth for $N_{sc}^{UL}$ subcarriers for $T_{slot}$ is illustrated as below.

TABLE 1

| Subcarrier spacing | $N_{sc}^{UL}$ | $T_{slot}$ |
|---|---|---|
| Δf = 3.75 kHz | 48 | 61440*$T_s$ |
| Δf = 15 kHz | 12 | 15360*$T_s$ |

In NB-IoT, each resource element (RE) in a resource grid may be defined as an index pair (k, l) in a slot when the time domain and the frequency domain indicate k=0, . . . , $N_{sc}^{UL}$−1 and l=0, . . . , $N_{symb}^{UL}$−1, respectively.

In NB-IoT, a downlink physical channel includes a narrowband physical downlink shared channel (NPDSCH), a narrowband physical broadcast channel (NPBCH), and a narrowband physical downlink control channel (NPDCCH). A downlink physical signal includes a narrowband reference signal (NRS), a narrowband synchronization signal (NSS), and a narrowband positioning reference signal (NPRS). The NSS includes a narrowband primary synchronization signal (NPSS) and a narrowband secondary synchronization signal (NSSS).

NB-IoT is a communication method for a wireless device using a reduced bandwidth (i.e., a narrowband) according to low complexity and low cost. NB-IoT communication is aimed at enabling a large number of wireless devices to be connected in the reduced bandwidth. Further, NB-IoT communication is aimed at supporting wider cell coverage than that in existing LTE communication.

Referring to Table 1, a carrier having a reduced bandwidth includes only one PRB when the subcarrier spacing is 15 kHz. That is, NB-IoT communication may be performed using only one PRB. Here, assuming that an NPSS/NSSS/NPBCH/SIB-NB is transmitted from a base station, a PRB that a wireless device access in order to receive the NPSS/NSSS/NPBCH/SIB-NB may be referred to as an anchor PRB (or anchor carrier). The wireless device may be allocated an additional PRB by the base station in addition to the anchor PRB (or anchor carrier). Here, among the additional PRBs, a PRB via which the wireless device does not expect to receive the NPSS/NSSS/NPBCH/SIB-NB from the base station may be referred to as a non-anchor PRB (or non-anchor carrier).

<Power Saving>

A common UE blind-decodes a PDCCH in an on occasion according to discontinuous reception (DRX). However, in an NB-IoT device, the transmission and reception of data may not be frequent in terms of the characteristic of the NB-IoT device. Accordingly, to frequently monitor a PDCCH even in an on occasion according to DRX may be inefficient. In order to maximize energy efficiency, an NB-IoT device may receive a PDCCH or another downlink signal even after receiving a power saving signal (or also called a wake up signal (WUS)).

Figure 9:
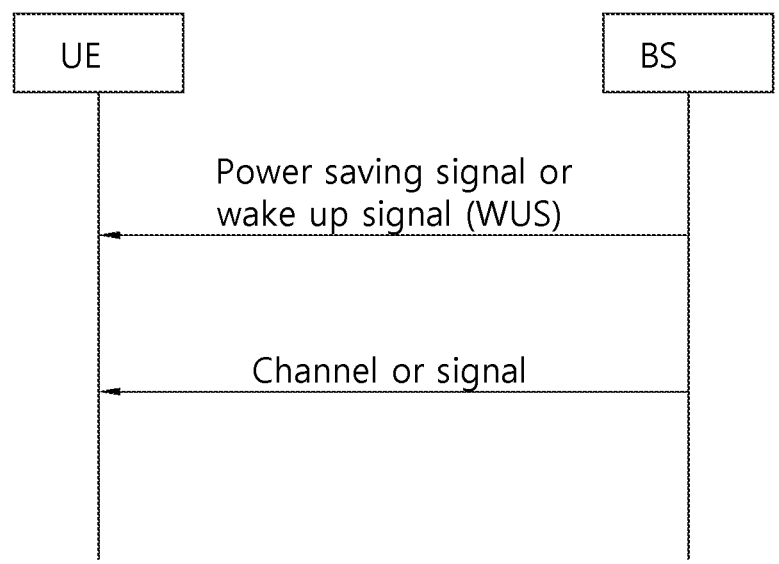
FIG. 9 is a flowchart illustrating an example in which a power saving signal (or WUS) is used.

FIG. 9 is a flowchart illustrating an example in which a power saving signal (or WUS) is used.

As may be seen with reference to FIG. 9, abase station may transmit a power saving signal (or WUS) before transmitting a PDCCH (or MPDCCH or NPDCCH). When the power saving signal (or WUS) is received, an NB-IoT device may monitor a PDCCH (or MPDCCH or NPDCCH).

<Disclosure of this Specification>

A power saving signal (or WUS) defined in this specification may be transmitted by abase station for the purpose of notifying whether a corresponding signal or channel has been transmitted or information of low payload before the base station transmits a specific signal or channel intended by the base station. The power saving signal (or WUS) may be used for the purpose of reducing power consumption necessary for the monitoring of a specific signal or channel. Specifically, if the repetition of a specific signal or channel is performed for an NB-IoT device or an MTC device, the corresponding device may monitor a power saving signal (or WUS) that is repeated in a less number of times without monitoring a channel repeated in a high number of times, thereby preventing unnecessary power consumption. Alternatively, this may have a purpose for delivering information while performing synchronization in the time/frequency within a faster time by substituting the role of a synchronization signal necessary for the monitoring of a specific signal or channel. Alternatively, the power saving signal (or WUS) may have a purpose for reducing overhead necessary for the transmission of a corresponding signal or channel by denoting an occasion on the time/frequency domain in which a specific signal or channel is transmitted.

Thereafter, this specification is described based on an NB-IoT, but it is evident that the same spirit of contents described in this specification in relation to a power saving signal (or WUS) may also be applied to common communication systems.

I. First Disclosure

According to a first disclosure, a base station sets the expired timer of a power saving signal (or WUS) and notifies an NB-IoT device of the set expired timer. After obtaining the last power saving signal (or WUS), if the NB-IoT device does not receive the power saving signal (or WUS) while the power saving signal (or WUS) expired timer is driven, the NB-IoT device may immediately monitor a corresponding channel by neglecting the power saving signal (or WUS).

If an NB-IoT device does not receive a power saving signal (or WUS), although a corresponding channel that needs to be actually received is present, the NB-IoT device may not monitor the corresponding channel. This may include (1) a case where it is difficult for a base station to secure a time/frequency resource for transmitting the power saving signal (or WUS) due to scheduling restriction or (2) a case where a base station has transmitted a power saving signal (or WUS), but an NB-IoT device does not recognize the power saving signal (or WUS). In the case of (1), if it is determined that to operate the power saving signal (or WUS) is not suitable from a long-term viewpoint, the base station may transmit the power saving signal (or WUS) to the NB-IoT device through a higher layer signal so that the power saving signal (or WUS) is no longer used. Alternatively, in order to notify this, the base station may transmit a message, such as SIB change notification. If SIB change notification is provided through a power saving signal (or WUS), this may not be a fundamental solution because a scheduling restriction problem occurs. In the case of (2), for example, if the repetition level of the power saving signal (or WUS) transmitted by the base station is not sufficient for the NB-IoT device, an actual power saving signal (or WUS) is present, but the probability that the NB-IoT device can receive the power saving signal (or WUS) may be low. In this case, the NB-IoT device may not receive a corresponding channel for a long time. In the two problems, a case where delay is increased or a normal operation fails may occur because the NB-IoT device cannot receive a corresponding channel for a long period.

In order to solve such a problem, the first disclosure proposes a method of directly monitoring, by an NB-IoT device, a corresponding channel without the monitoring of a power saving signal (or WUS) by considering that the power saving signal (or WUS) is no longer transmitted by a base station if the NB-IoT device does not receive the power saving signal (or WUS) for a given time. A base station may notify an NB-IoT device of a power saving signal (or WUS) expired timer through a higher layer signal, such as an SIB or an RRC signal.

If the proposed method is used, expected gains are as follows. (1) There is an advantage in that overhead is not increased because a base station does not need to transmit a separate signal in order to notify whether a power saving signal (or WUS) is operated. (2) If traffic to be processed by a base station is temporarily much, a corresponding channel may be scheduled for an NB-IoT device without overhead for transmitting a power saving signal (or WUS). (3) Furthermore, although an actual power saving signal (or WUS) is operated, the probability that an NB-IoT device can detect a corresponding channel can be maintained identically.

Figure 10:
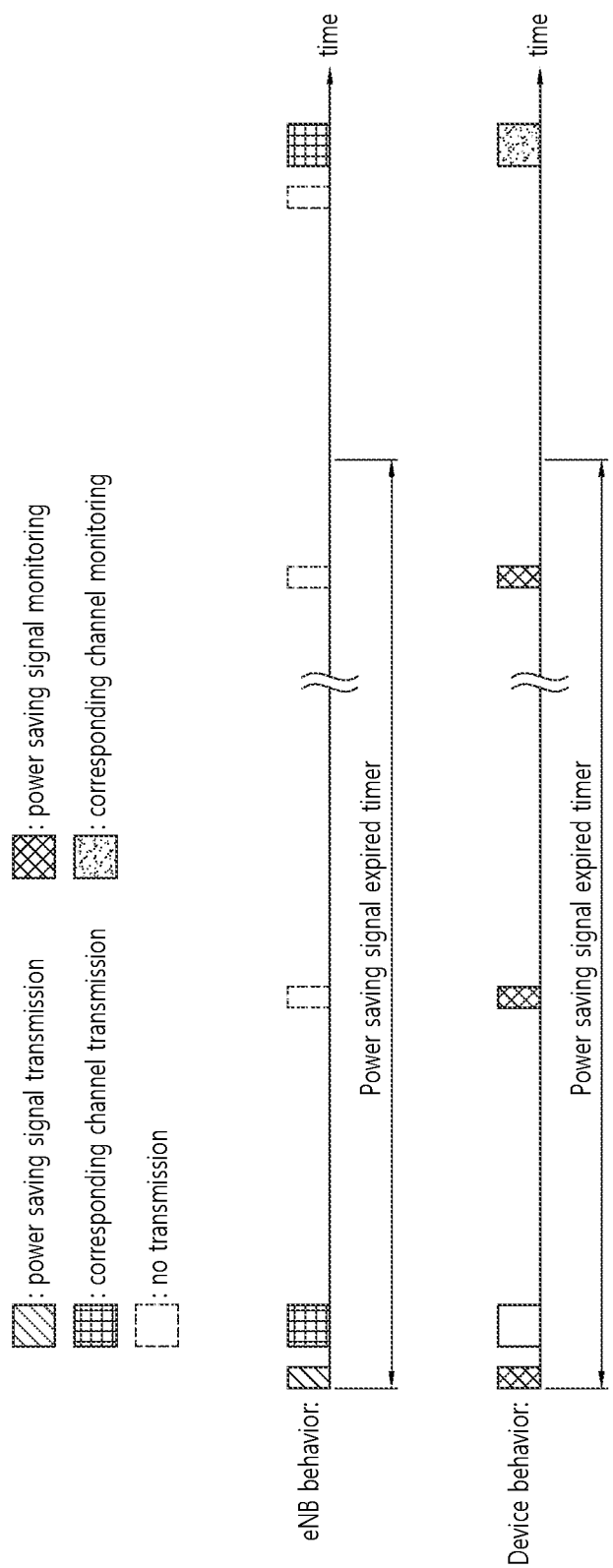
FIG. 10 illustrates an example in which a base station and an NB-IoT device apply an expired timer.

FIG. 10 illustrates an example in which a base station and an NB-IoT device apply an expired timer.

The longest time taken for an NB-IoT device to expect a power saving signal (or WUS) may be defined through an expired timer. The expired timer may be applied (or driven) from timing at which the transmission and reception of a previous power saving signal (or WUS) is started (or ended). From the viewpoint of the transmission stage (i.e., base station), the expired timer may be driven from timing at which the power saving signal (or WUS) was finally transmitted. After the expired timer, if the base station wants to transmit a corresponding channel, it may omit the transmission of the power saving signal (or WUS) and directly transmit the corresponding channel. From the viewpoint of the reception stage (i.e., NB-IoT device), the NB-IoT device may drive an expired timer from timing at which a power saving signal (or WUS) was finally received. After the expired timer, the NB-IoT device may omit the monitoring of a power saving signal (or WUS) and directly monitor a corresponding channel.

In this case, although the power saving signal (or WUS) is not actually present, the NB-IoT device detects it as an error, there is a possibility that the NB-IoT device may stop the driving of the expired timer. In order to prevent this, although the NB-IoT device determines that the power saving signal (or WUS) is present, it may continue to drive the expired timer if it fails in detecting a corresponding channel.

As another method, the time when an RRC connection was released with respect to an expired timer may be taken into consideration. For example, timing at which the transmission of a downlink control channel (e.g., NPDCCH, MPDCCH, EPDCCH or PDCCH) or a downlink data channel (e.g., NPDSCH or PDSCH) used for a base station to indicate the release of an RRC connection with respect to an NB-IoT device is terminated or timing at which the transmission of an uplink control channel (e.g., NPUSCH format 2 or PUCCH) or an uplink data channel (e.g., NPUSCH format 1 or PUSCH) through which an NB-IoT device reports, to a base station, that it will perform the release of an RRC connection is terminated may be determined as reference timing at which an expired timer is started.

As another method, an expired timer may be driven based on reference timing of an absolute time unit operated by a base station. For example, operation timing of an expired timer may be determined based on a time unit, such as a system frame number (SFN) or a hyper frame number (HFN) which may be identically recognized by a base station and an NB-IoT device. As a detailed method, the expired timer may be represented in a window form. For example, the window may be defined using an SFN and/or an HFN. The window may be defined by an occasion that is continuously counted from a reference subframe index (e.g., the first subframe included in SFN=0) represented using a specific SFN and/or HFN and that is repeated in an N-subframe unit. When a power saving signal (or WUS) is detected within a specific window, an NB-IoT device may assume that a power saving signal (or WUS) may be transmitted even within a next expired timer window. In contrast, when a power saving signal (or WUS) is not detected within a first window, an NB-IoT device may assume that the transmission of a power saving signal (or WUS) from a next window occasion will not be present.

I-1. Proposal 1 of First Disclosure

If the method of the first disclosure is used and an NB-IoT device does not receive a corresponding channel during a power saving signal (or WUS) reconfirmation timer, the NB-IoT device may request a base station to update configuration information of a power saving signal (or WUS).

After an expired timer, if an NB-IoT device stops an operation related to a power saving signal (or WUS), power consumption of the NB-IoT device may be increased compared to previous power consumption. Accordingly, there may be a need for a method capable of restarting an operation related to a power saving signal (or WUS). Furthermore, if the repetition level of a power saving signal (or WUS) configured by a base station is not sufficient, an NB-IoT device may need to report its own status to a base station in order to update the configuration of a power saving signal (or WUS).

In order to solve the aforementioned problem, this paragraph proposes a method of setting the reconfirmation timer of a power saving signal (or WUS) and enabling an NB-IoT device to make a request for the update of information related to a power saving signal (or WUS) if the NB-IoT device does not receive a corresponding channel during the reconfirmation timer. For example, the NB-IoT device may perform the request through an uplink channel, such as an RACH. A value of the reconfirmation timer may include a predetermined and fixed value or may include a value implicitly or explicitly set through a higher layer signal.

The reconfirmation timer may be driven simultaneously with an expired timer defined in the first disclosure. Alternatively, the reconfirmation timer may be started from timing at which the expired timer defined in the first disclosure expires.

I-2. Proposal 2 of Second Disclosure

According to Proposal 2, if an NB-IoT device does not receive a corresponding channel during a searching timer for change notification, the NB-IoT device may start the monitoring of a power saving signal (or WUS) again.

If a base station no longer supports a power saving signal (or WUS), it has to transmit, to an NB-IoT device, change notification that notifies a change in the configuration. For example, if a corresponding channel is a paging signal, a base station may notify an NB-IoT device of information for SIB change notification through a paging signal. The NB-IoT device may confirm an SIB for a power saving signal (or WUS) again, and may obtain information for a change in the configuration of a power saving signal (or WUS). Accordingly, if information for change notification is not provided, the NB-IoT device may assume that configuration information of a previously obtained power saving signal (or WUS) is still valid.

Proposal 2 proposes a method of defining a change notification searching timer using such a characteristic and resuming, by an NB-IoT device, the monitoring of a power saving signal (or WUS) if the NB-IoT device does not receive a corresponding channel during this occasion. In this case, if Proposal 2 of the first disclosure is used along with the first disclosure, an NB-IoT device may start the expired timer of the first disclosure again from timing at which a searching timer of change notification is terminated.

The searching timer defined in Proposal 2 of the first disclosure may have the same start timing as the expired timer defined in the first disclosure. Alternatively, a searching timer of change notification may be started from timing at which the expired timer defined in the first disclosure has expired.

II. Second Disclosure

According to the second disclosure, if a power saving signal (or WUS) is configured to be used, a base station may configure the skip occasion of the power saving signal (or WUS) and notify an NB-IoT device of the configured skip occasion. The NB-IoT device may assume that a corresponding channel is transmitted by the base station although a power saving signal (or WUS) is not present at the location of the skip occasion.

If an NB-IoT device determines whether to monitor a corresponding channel using a power saving signal (or WUS), a base station may need to transmit a power saving signal (or WUS) at timing before the corresponding channel occurs. However, (1) a case where the transmission of a power saving signal (or WUS) is not easy due to scheduling restriction or (2) a case where the monitoring of a power saving signal (or WUS) is impossible or cannot be performed because a repetition level of the power saving signal (or WUS) is not sufficient may occur.

In order to solve such a problem, the second disclosure proposes a method of configuring the period in which a corresponding channel is transmitted without the transmission of a power saving signal (or WUS). If the method of the second disclosure is used, an NB-IoT device determines whether to monitor a corresponding channel after monitoring a power saving signal (or WUS) at normal times, but may directly monitor a corresponding channel without monitoring a power saving signal (or WUS) at timing designated as a skip occasion.

The skip occasion may be configured based on one of the following several options.

(Option 2-1) an NB-IoT device may directly monitor a corresponding channel without the monitoring of a power saving signal (or WUS) in the occasion #N~#(N+T) of an SFN (or HFN).

(Option 2-2) an NB-IoT device may determine the location of a skip occasion based on a time occasion corresponding to N times the DRX cycle T of a corresponding channel.

Figure 11A:
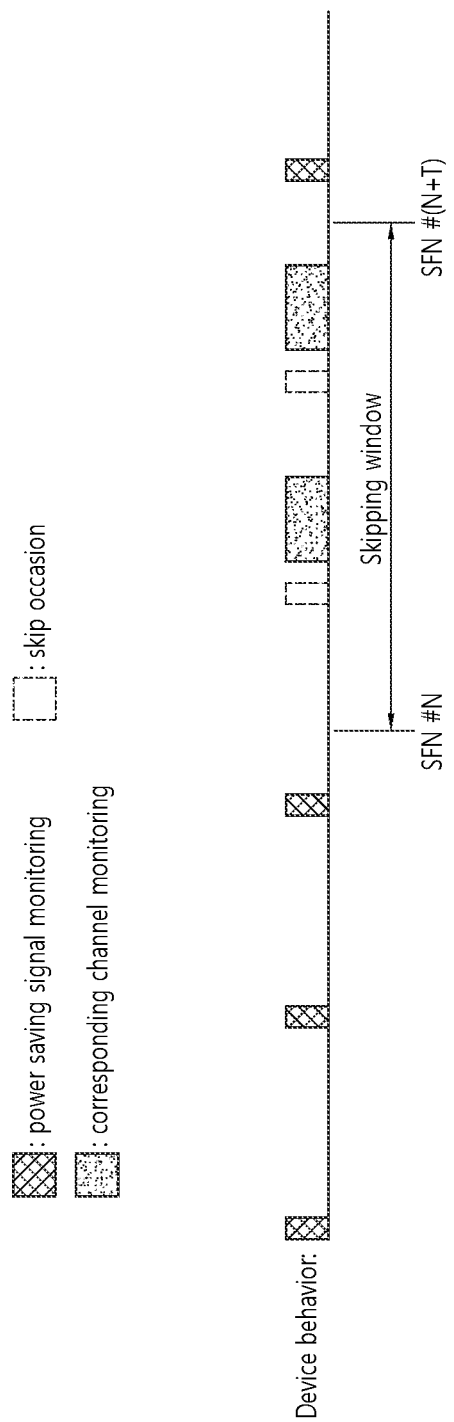
FIGS. 11a and 11b are exemplary diagrams illustrating an operation of the NB-IoT device in a skip occasion according to Option 2-1 of a second disclosure.
Figure 11B:
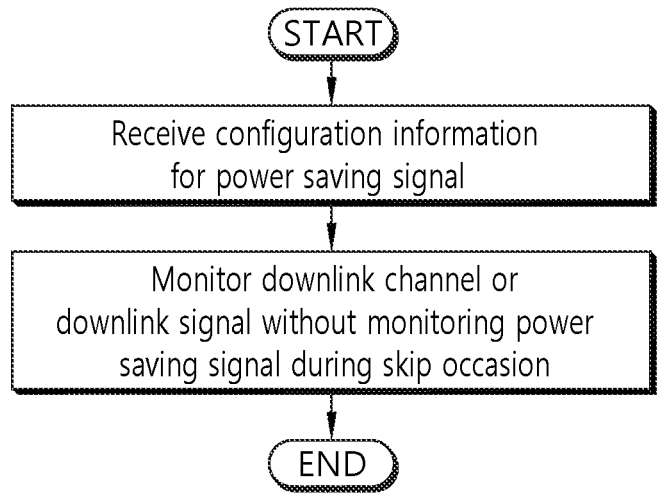

FIGS. 11a and 11b are exemplary diagrams illustrating an operation of an NB-IoT device in a skip occasion according to Option 2-1 and Option 2-2 of the second disclosure.

Referring to FIG. 11b, an NB-IoT device receives configuration information for a power saving signal. The configuration information may include configuration information for the skip occasion of the power saving signal.

Referring to FIGS. 11a and 11b, during the skip occasion, the NB-IoT device may monitor a downlink channel or downlink signal without the monitoring of a power saving signal.

In the case of Option 2-1, a base station may determine a subframe occasion for skipping the monitoring of a power saving signal (or WUS), and may notify an NB-IoT device of related information. In this case, the related information may include an SFN (or HFN) #N in which the application of a skip operation is started and an applied period T, and may be transmitted through a higher layer signal, such as an SIB or RRC signal.

Figure 12:
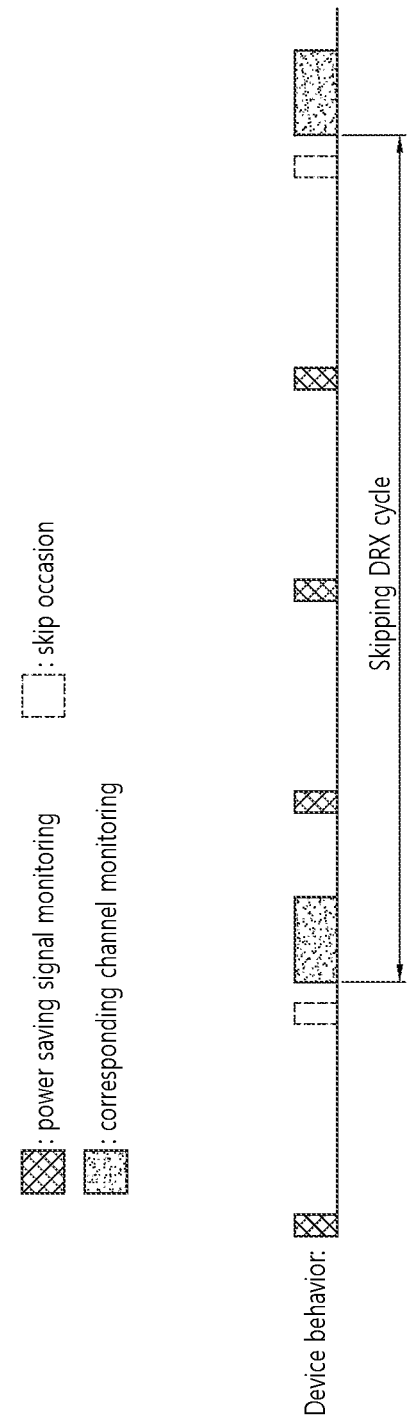
FIG. 12 is an exemplary diagram illustrating an operation of an NB-IoT device according to Option 2-2 of the second disclosure.

FIG. 12 is an exemplary diagram illustrating an operation of an NB-IoT device according to Option 2-2 of the second disclosure.

In the case of Option 2-2, a base station may determine to notify an NB-IoT device of a separate DRX cycle for skipping the monitoring of a power saving signal (or WUS). In this case, the separate DRX cycle may be represented as a multiple of a DRX cycle in which a corresponding channel is used. The multiple value N may be transmitted to an NB-IoT device through a higher layer signal, such as an SIB or RRC signal.

In the case of an NB-IoT device to which eDRX is applied, the eDRX may be identically applied using an eDRX cycle as a unit. In this case, a separate DRX cycle may be calculated in an eDRX unit. In this case, a skip operation may be applied to (1) only some paging occasion (PO) in a paging transmission window (PTW) region within the on occasion state of DRX. For example, the monitoring of a power saving signal (or WUS) may be skipped with respect to the last paging occasion (PO) in the PTW region. Alternatively, (2) the monitoring of a power saving signal (or WUS) may be skipped during all the paging occasions of a specific PTW region. For example, if an eDRX cycle occurs in a period of $T_e$, a separate eDRX cycle corresponding to a period of $N*T_e$ may be configured.

If the method of Option 2-2 is applied to a cell-specific search space that needs to be simultaneously monitored by multiple NB-IoT devices, a separate DRX cycle may operate based on a cell-specific DRX cycle. For example, if a corresponding channel corresponds to a common search space (CSS) for reading a paging signal, the separate DRX cycle may be defined as a multiple of a cell-specific DRX cycle $T_c$. In the case of a paging signal, a paging occasion (or an SFN in which paging is started) corresponding the skip occasion may be determined by the following equation.

$$SFN \bmod T_{skip} = \left(\frac{T_{skip}}{M}\right) \times (UE\_ID \bmod M) \qquad \text{[Equation 1]}$$

In the above equation, $T_{skip}$ means a separate DRX cycle, and has a relation equation of $T_{skip} = TC \times N$.

III. Third Disclosure

According to the third disclosure, if a power saving signal (or WUS) is configured to be used, a repetition level applied to the power saving signal (or WUS) may be one or more.

If an NB-IoT device determines whether to monitor a corresponding channel using a power saving signal (or WUS), a base station may need to transmit the power saving signal (or WUS) at timing before the corresponding channel occurs. However, (1) a case where the transmission of a power saving signal (or WUS) is not easy for scheduling restriction or (2) a case where the monitoring of a power saving signal (or WUS) is impossible or cannot be performed because a repetition level of the power saving signal (or WUS) is not sufficient if a coverage level is not good may occur.

Furthermore, if a power saving signal (or WUS) is used for downlink synchronization, it is necessary to guarantee a higher level of a repetition level compared to a case where a power saving signal (or WUS) is not used for downlink synchronization. If a power saving signal (or WUS) is used for downlink synchronization, an NB-IoT device can obtain a power saving gain because it can omit an operation of performing downlink synchronization using an external synchronization signal, such as a PSS/SSS (or NPSS/NSSS). However, there is a disadvantage in that the repetition number needs to be increase because a power saving signal (or WUS) is used to perform downlink synchronization. In contrast, if a power saving signal (or WUS) is not used for downlink synchronization or the repetition number is not sufficient, an NB-IoT device needs to first perform downlink synchronization using an external synchronization signal before monitoring a power saving signal (or WUS).

Furthermore, problems, which may occur if a maximum repetition level at which a repetition level of a power saving signal (or WUS) is determined in a cell unit and an actual repetition level designated for each NB-IoT device are independently present, may be taken into consideration. An actual repetition level of a power saving signal (or WUS) may be configured to be lower than a maximum repetition level set for a specific NB-IoT device(s) having high received signal intensity within coverage. If an actual repetition level is determined based on a specific condition, an NB-IoT device may perform the monitoring of its own power saving signal (or WUS) based on the actual repetition level. This may have a purpose for obtaining an overhead reduction effect for reducing resources consumed for the transmission of a power saving signal (or WUS) from the viewpoint of a base station. From the viewpoint of an NB-IoT device, a power consumption saving effect can be maximized because the monitoring of a power saving signal (or WUS) region is reduced. However, if a criterion for determining an actual occasion is incomplete or a required actual repetition level is changed because the coverage state of an NB-IoT device is changed, a method for the reference or a changed actual repetition level may be necessary.

The third disclosure proposes a method of differently configuring a repetition level of a power saving signal (or WUS) depending on a power saving signal (or WUS) occasion. To this end, a base station needs to provide an NB-IoT device with information for different repetition levels and a power saving signal (or WUS) occasion to which each repetition level is applied. The base station may transmit the corresponding information to the NB-IoT device through a higher layer signal, such as an SIB or RRC signal.

According to the third disclosure, if two repetition levels are operated, one repetition level may be designated as a base repetition level, and the other repetition level may be defined and operated as an additional repetition level. For example, the base repetition level may be considered to be a cell-common maximum repetition level, and the additional repetition level may be considered to be an actual repetition level. Alternatively, both the base repetition level and the additional repetition level may be configured in a cell-common manner (or in a UE-specific manner). A power saving signal (or WUS) occasion to which the additional repetition level is applied may be configured based on one of the following options.

(Option 3-1) an NB-IoT device may monitor a power saving signal (or WUS) by applying the additional repetition level in the occasion #N~#(N+T) of an SFN (or HFN) and applying the base repetition level in other occasions.

Figure 13:
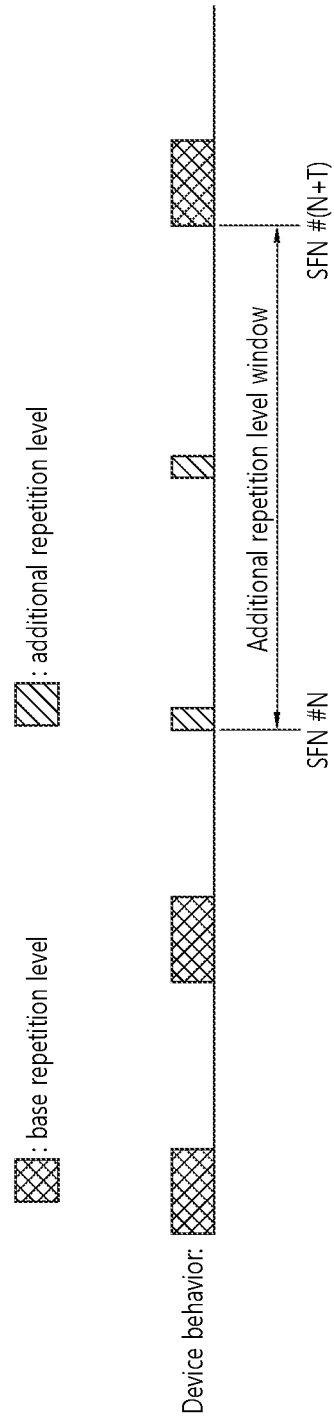
FIG. 13 is an exemplary diagram illustrating an operation of an NB-IoT device according to Option 3-1 of a third disclosure.

FIG. 13 is an exemplary diagram illustrating an operation of an NB-IoT device according to Option 3-1 of a third disclosure.

FIG. 13 illustrates an operation of an NB-IoT device if an actual corresponding channel is not present.

In the case of Option 3-1, a base station may determine a subframe occasion for applying an additional repetition level to a power saving signal (or WUS), and may transmit related information to an NB-IoT device.

The related information may include an SFN (or HFN) #N in which the application of the additional repetition level is started and an applied period T, and may be transmitted through a higher layer signal, such as an SIB or RRC signal.

(Option 3-2) an NB-IoT device may determine the location where an additional repetition level is applied to a power saving signal (or WUS) based on a time occasion corresponding to N times the DRX cycle T of a corresponding channel. A base repetition level is applied in other occasions.

In the case of Option 3-2, a base station may notify an NB-IoT device of a separate DRX cycle for applying an additional repetition level to the monitoring of a power saving signal (or WUS). In this case, the separate DRX cycle may be represented as a multiple of a DRX cycle in which a corresponding channel is used. The multiple value N may be transmitted to the NB-IoT device through a higher layer signal, such as an SIB or RRC signal.

In the method described in Option 3-2, for an NB-IoT device to which eDRX is applied, eDRX may be applied using an eDRX cycle as a unit. In this case, a separate DRX cycle for applying an additional repetition level to the monitoring of a power saving signal (or WUS) may be calculated in an eDRX unit. In this case, the additional repetition level may be applied (1) only in some paging occasion in a paging transmission window (PTW) region within an on duration of DRX. For example, in the PTW region, the last paging occasion (PO) may be determined to apply a base repetition level (e.g., a maximum repetition level) to the monitoring of a power saving signal (or WUS), and may be determined to use an additional repetition level (e.g., an actual repetition level) in the remaining regions. Alternatively, (2) an additional repetition level may be applied to all the paging occasions of a specific PTW region. For example, if an eDRX cycle is set as a period of $T_e$, an additional repetition level (e.g., an actual repetition level) may be determined to be applied at normal times, and a base repetition level (e.g., a maximum repetition level) may be determined to be applied every period of $N*T_e$.

If the method of Option 3-2 is applied to a cell-specific search space that needs to be simultaneously monitored by multiple NB-IoT devices, a separate DRX cycle for applying an additional repetition level to the monitoring of a power saving signal (or WUS) may operate based on a cell-specific DRX cycle. For example, if a corresponding channel corresponds to a common search space for reading a paging message, a separate DRX cycle for applying an additional repetition level to the monitoring of a power saving signal (or WUS) may be defined as a multiple of a cell-specific DRX cycle $T_c$. In the example of the paging, a paging occasion (or an SFN in which paging is started) corresponding to the occasion of a power saving signal (or WUS) to which an additional repetition level is applied may be determined by the following equation. In the following equation, $T_{add}$ means a separate DRX cycle for applying an additional repetition level to the monitoring of a power saving signal (or WUS). There is a relation equation of $T_{add}=T_c \times N$.

$$SFN \bmod T_{add} = \left(\frac{T_{add}}{M}\right) \times (UE\_ID \bmod M) \quad \text{[Equation 2]}$$

Figure 14:
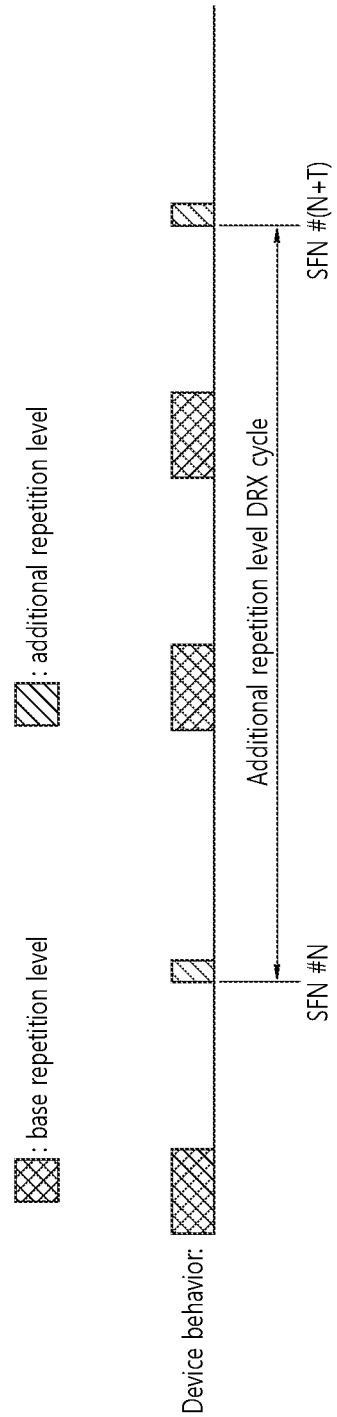
FIG. 14 is an exemplary diagram illustrating an operation of an NB-IoT device according to Option 3-2 of the third disclosure.

FIG. 14 is an exemplary diagram illustrating an operation of an NB-IoT device according to Option 3-2 of the third disclosure.

FIG. 14 illustrates an operation of an NB-IoT device if an actual corresponding channel is not present.

Meanwhile, in the method proposed in the third disclosure, power saving signals (or WUSs) having repetition levels used at different occasions may be different. This (1) may have a purpose for adjusting the amount of information which may be represented using a power saving signal (or WUS) if a repetition level is different and (2) may have a purpose for not providing a downlink synchronization capability in the case of a power saving signal (or WUS) corresponding to a small repetition level by taking into consideration a downlink synchronization effect and assigning the downlink synchronization capability in the opposite case.

IV. Fourth Disclosure

According to the fourth disclosure, an NB-IoT device may determine whether to skip a power saving signal (or WUS) based on its own UE_ID with respect to a corresponding channel at specific timing.

In the situation in which a corresponding channel is a common channel in common monitored by multiple NB-IoT devices and a power saving signal (or WUS) is also monitored by multiple NB-IoT devices in common, if a power saving signal (or WUS) transmitted in order to schedule a corresponding channel of a specific NB-IoT device is transmitted, other NB-IoT devices that do not require an actual corresponding channel may also monitor the corresponding channel. In such a case, unnecessary power consumption is caused because an NB-IoT device that does not require an actual corresponding channel performs unnecessary monitoring.

In order to supplement such a problem, the fourth disclosure proposes a method of determining, by an NB-IoT device, whether to monitor a power saving signal (or WUS) based on its own identifier (e.g., UE_ID). In this case, NB-IoT devices that share an occasion in which saving signals (or WUSs) have the same power may be divided into sub-groups based on their identifiers (UE_ID). For example, if NB-IoT devices sharing an occasion in which saving signals (or WUSs) have the same power are divided into $N_{sub}$ sub-groups, the NB-IoT device may determine whether to monitor a specific power saving signal (or WUS) occasion by performing a modular operation of $N_{sub}$ on its own identifier (UE_ID).

As an example of the fourth disclosure, in the situation in which a corresponding channel is to be assigned to a specific NB-IoT device, if the skip occasions of a power saving signal calculated based on the identifier (UE_ID) of the corresponding NB-IoT device are contiguous, a base station may transmit only the corresponding channel without the transmission of a power saving signal (or WUS). In this case, other NB-IoT devices that monitor a power saving signal (or WUS) in a corresponding occasion may perform an operation of monitoring a corresponding channel because it has not obtained a power saving signal (or WUS). Accordingly, a power consumption saving effect occurs. Meanwhile, an NB-IoT device that requires a corresponding channel can obtain the corresponding channel without an increase in the missing probability because it performs the monitoring of the corresponding channel.

Figure 15:
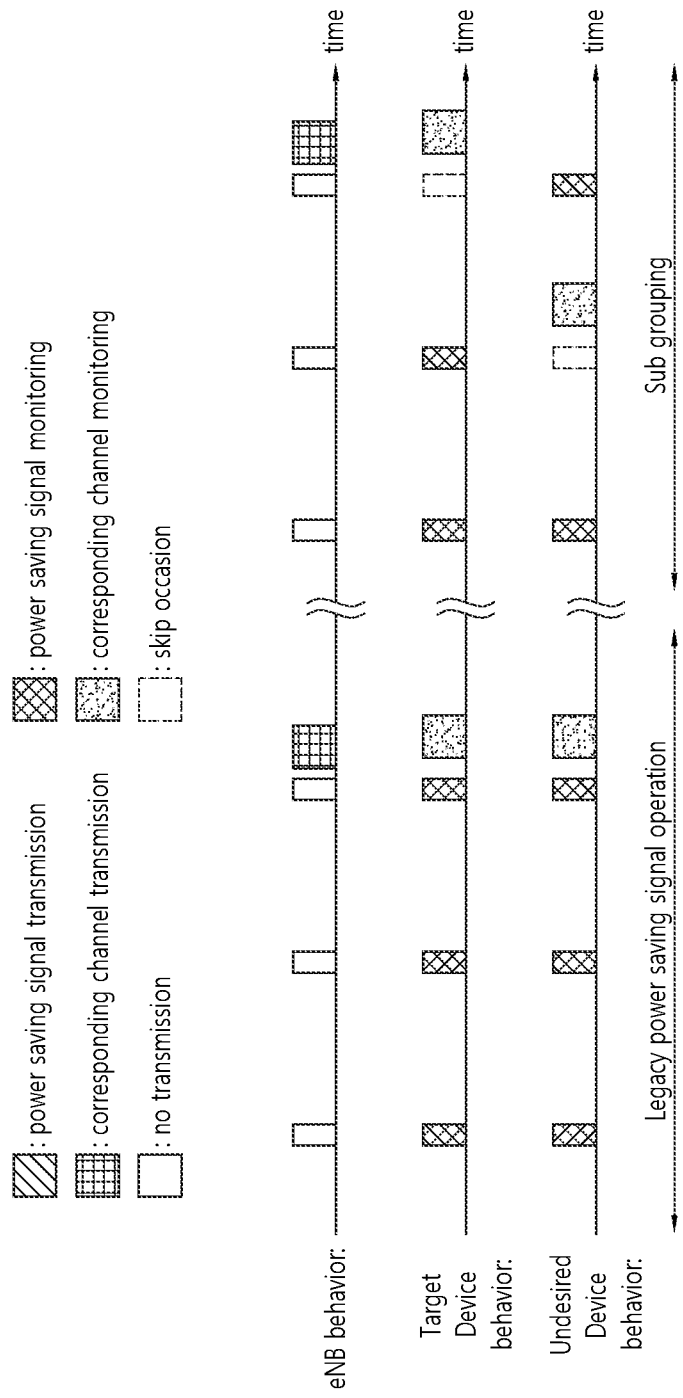
FIG. 15 is an exemplary diagram illustrating an operation of an NB-IoT device according to a fourth disclosure.

FIG. 15 is an exemplary diagram illustrating an operation of an NB-IoT device according to a fourth disclosure.

FIG. 15 illustrates operations of an NB-IoT device that requires a corresponding channel and an NB-IoT device that does not require a corresponding channel. FIG. 15 illustrates an example in which the fourth disclosure is not applied to an operation of the existing power saving signal and the fourth disclosure is applied to a sub-group region.

V. Fifth Disclosure

An NB-IoT device may determine whether to monitor a power saving signal (or WUS) based on its own RSRP.

When a base station determines a repetition level of a power saving signal (or WUS), it may determine the repetition level using a coverage level and overhead to be supported by the base station as conditions. However, the missing probability of a power saving signal (or WUS) may be increased because a repetition level of the power saving signal (or WUS) supported by the base station is insufficient for a specific NB-IoT device. Accordingly, an intended target condition may not be satisfied. However, the base station may not be aware of whether it supports a suitable repetition level for a corresponding NB-IoT device because it does not determine a coverage level of a given NB-IoT device. If a repetition level is not suitable, an NB IoT device may fail in the reception of a corresponding channel.

The fifth disclosure proposes a method of autonomously determining whether to use a power saving signal (or WUS) based on RSRP measured by an NB-IoT device and a threshold value. In this case, the RSRP means a measurement result by which an NB-IoT device can estimate its own coverage level based on signals received from a base station. Accordingly, the proposed contents may be identically applied to a method using another measured value which may have a similar effect. If RSRP measured by an NB-IoT device is a specific threshold value or more, the NB-IoT device may determine to perform an operation of monitoring a power saving signal (or WUS) in order to check whether a corresponding channel has been transmitted. In the opposite case, the NB-IoT device may always monitor a corresponding channel regardless of whether a power saving signal (or WUS) is present (or without performing the monitoring of a power saving signal (or WUS)).

In this case, the threshold value may be determined dependently on configuration information of a power saving signal (or WUS). For example, the threshold value may be determined dependently on a repetition level and/or transmission power of a power saving signal (or WUS). In this case, the threshold value may be shared by a base station and an NB-IoT device because the threshold value is defined in the standard specification so that the base station and an NB-IoT device can have the same assumption. Alternatively, the threshold value may be individually determined by an implementation of an NB-IoT device.

Alternatively, a specific threshold value may be configured by a base station and transmitted to an NB-IoT device. In this case, the threshold value may be configured in the NB-IoT device through a higher layer signal, such as an SIB or RRC signal. Alternatively, the threshold value may be dynamically controlled through DCI of a control channel which may be obtained before an NB-IoT device monitors a power saving signal (or WUS).

(Option 5-1) an NB-IoT device may request a change to a suitable power saving signal (or WUS) configuration from a base station if its own RSRP does not satisfy a threshold value suitable for monitoring a power saving signal (or WUS).

Specifically, if it is not suitable for monitoring a power saving signal (or WUS) because RSRP of a specific NB-IoT device does not satisfy a threshold value, the NB-IoT device may perform a request for changing the configuration of a power saving signal (or WUS) on a base station in order to increase its own power efficiency. For example, an NB-IoT device may transmit a specific signal or channel to a base station for the purpose of requesting a higher repetition level.

In this case, the requested information may be its own RSRP value or may be a repetition level (and/or power level) suitable for the NB-IoT device. Alternatively, an NB-IoT device may report whether its own RSRP currently satisfies a threshold value through 1-bit information simply.

(Option 5-2) a base station may notify an NB-IoT device of information for transmission power of a signal for calculating RSRP and/or transmission power of a power saving signal (or WUS).

In order for an NB-IoT device to measure RSRP and to calculate a threshold value, the NB-IoT device needs to be aware of the transmission power size of an RSRP reference signal.

In this case, the RSRP may be measured through a power saving signal (or WUS). In this case, a base station may notify the NB-IoT device of information related to transmission power of a power saving signal (or WUS) so that the NB-IoT device can accurately measure RSRP or use the information for a process of calculating a threshold value. In this case, the information may be the size of absolute transmission power by which the power saving signal (or WUS) is transmitted or may be a relative ratio compared to transmission power of another signal (e.g., NRS, CRS, or other channels). If RSRP is measured using a power saving signal (or WUS), a base station may always transmit a power saving signal (or WUS) at a periodically agreed location.

In this case, the RSRP may be performed on a channel in which size information of transmission power is already transmitted, such as an NRS or CRS. In this case, if additional information is not present, an NB-IoT device may determine a threshold value of RSRP based on information of an NRS and/or a CRS or may use a threshold value and RSRP value for a comparison. Alternatively, an NRS/CRS and the power offset of a power saving signal (or WUS) may be transmitted by a base station. This may have a purpose for using the NRS/CRS and the power offset in a process of incorporating the influence of the power offset into the calculation of a threshold value or comparing threshold values and RSRP values if a signal for calculating RSRP and a signal for performing an actual targeted operation are different.

VI. Sixth Disclosure

According to the sixth disclosure, a repetition level of a power saving signal (or WUS) may be changed over time.

A repetition level agreed between a base station and an NB-IoT device may not be valid if the NB-IoT device moves or depending on a change in the channel environment. In order to prevent such a situation, this paragraph proposes a method of changing a repetition level of a power saving signal (or WUS) over time.

Specifically, a repetition level may be determined to have a higher value after a specific time from timing at which a repetition level was previously determined. This may have a purpose for preparing a case where an NB-IoT device has a poorer coverage level. In the proposed method, the degradation of performance does not occur although an NB-IoT device maintains the same coverage level or has a better coverage level. In this case, the specific time may be defined like a timer. The timer may be determined to be initialized at timing at which a repetition level was finally determined.

For example, an initial repetition level of an NB-IoT device may be determined using one of the following options. Thereafter, a change in the repetition level overtime may be expected according to a pre-defined rule. In this case, the initial repetition level may be determined in a UE-specific manner for each NB-IoT device, but may be determined based on a repetition level set in a cell-common manner.

(Option 6-1) a repetition level set for the purpose of NPUSCH transmission finally performed by an NB-IoT device (Option 6-2) a set repetition level (e.g., a repetition number value designated in Rmax or DCI) of an NPDCCH and/or NPDSCH finally received by an NB-IoT device in a connected mode (Option 6-3) the final coverage enhancement (CE) level at which an NB-IoT device has succeeded in the transmission of a random access preamble in an RACH process (Option 6-4) a repetition level set for an NPDCCH and/or NPDSCH finally received by an NB-IoT device in a process of receiving a second message (e.g., Msg2) or a process of receiving a fourth message (e.g., Msg4) in an RACH process (Option 6-5) a repetition level configured by a base station through a separate signal for the purpose of setting an initial repetition level A unit by which a repetition level is increased may be calculated based on an absolute time or the number of available time domain resource. Assuming that timing at which an initial repetition level is determined is n0, the repetition level may be determined to be higher at timing n0+k0. In this case, if an NB-IoT device exchanges signals capable of determining a coverage level with a base station prior to timing k0, the initial repetition level may be determined to be set based on a corresponding signal. In this case, if a unit by which a repetition number is increased is an absolute time, a value k0 may be determined as the number of all slots or subframes regardless of whether the slots or subframes are available. If the unit by which a repetition number is increased is an available time domain resource, the value k0 may be determined as the number of slots or subframes in which a power saving signal (or WUS) may be transmitted like a valid DL subframe.

Alternatively, the unit by which a repetition level is increased may be calculated based on the number of power saving signal (or WUS) occasions. To this end, there may be a counter parameter for calculating the number of power saving signal (or WUS) occasions occurred. For example, for convenience of description, if the counter parameter is defined as CountPOforRepLevel, a CountPOforRepLevel value may be reset to a value of 0 at timing at which an initial repetition level is determined (or before the first power saving signal (or WUS) occasion which may be monitored by an NB-IoT device appears after an initial repetition level is determined). Thereafter, a value of CountPOforRepLevel may be determined to be increased by 1 whenever an occasion for a power saving signal (or WUS) occurs (or whenever the monitoring of a power saving signal (or WUS) fails). If a value of CountPOforRepLevel exceeds a preset (or set through a higher layer signal) specific threshold value, thereafter, an NB-IoT device may expect that a repetition level will increase from the occasion of a power saving signal (or WUS).

A repetition level may be determined to continue to be updated after each specific timing according to a predetermined rule after an initial repetition level is determined. In this case, an optional maximum repetition level may be determined to not exceed a cell-specific repetition level.

An NB-IoT device may determine a repetition level to be monitored based on RSRP and timing. For example, according to the sixth disclosure, an NB-IoT device may determine to maintain a repetition level without any change if the size of measured RSRP is maintained without any change even after a specific time or may determine that the monitoring of a power saving signal (or WUS) is possible through a lower repetition level if an RSRP situation becomes better. In contrast, if a base station is unaware of the RSRP situation of an NB-IoT device, it determines a repetition level according to a method agreed in the sixth disclosure.

VII. Seventh Disclosure

In the seventh disclosure, in the situation in which a power saving signal (or WUS) is used to notify whether to monitor a corresponding channel that is periodically transmitted, if the transmission of a power saving signal (or WUS) corresponding to a corresponding channel at specific timing is dropped, whether to monitor the corresponding channel at the corresponding timing may be indicated by a power saving signal (or WUS) at previous timing thereof.

The transmission of the power saving signal (or WUS) by another signal or channel may be impossible. For example, in an occasion in which the transmission of a signal or channel whose transmission needs to be guaranteed with high priority, such as a synchronization signal or SIB, is necessary, the transmission of a power saving signal (or WUS) may be impossible. If the transmission of a corresponding signal or channel extends over a long occasion, the transmission of a power saving signal (or WUS) itself may be dropped. In this case, from the viewpoint of an NB-IoT device that determines whether to monitor a corresponding channel through the power saving signal (or WUS), there is a problem in that delay and reliability may be decreased because the monitoring occasion of the corresponding channel is lost.

In order to solve such a problem, as a simple method, if a corresponding power saving signal (or WUS) is a dropped corresponding channel, there may be a method of determining to monitor a power saving signal (or WUS) regardless of whether the power saving signal (or WUS) has been transmitted. However, in this case, there is a disadvantage in that a power saving gain through the power saving signal (or WUS) at the location of a corresponding channel cannot be obtained.

In order to solve such a problem, in this paragraph, if the transmission of a power saving signal (or WUS) corresponding to a corresponding channel at specific timing is dropped, whether to monitor the corresponding channel at the corresponding timing may be indicated based on a power saving signal (or WUS) at previous timing thereof. For example, assuming that in NB-IoT, an NPDCCH for a paging object is a corresponding channel and a paging occasion (PO) occurs in a period of T, a case where a power saving signal (or WUS) corresponding to the location of a specific paging occasion (PO) is overlapped with an SIB transmission location and dropped may be taken into consideration. In this case, whether to monitor the corresponding paging occasion (PO) may be indicated by the transmission of a power saving signal (or WUS) corresponding to a previous paging occasion (PO). If the power saving signal (or WUS) corresponding to the previous paging occasion (PO) is indicated to not perform the monitoring of a corresponding channel, the monitoring may be skipped without being performed during the corresponding paging occasion (PO).

Figure 16:
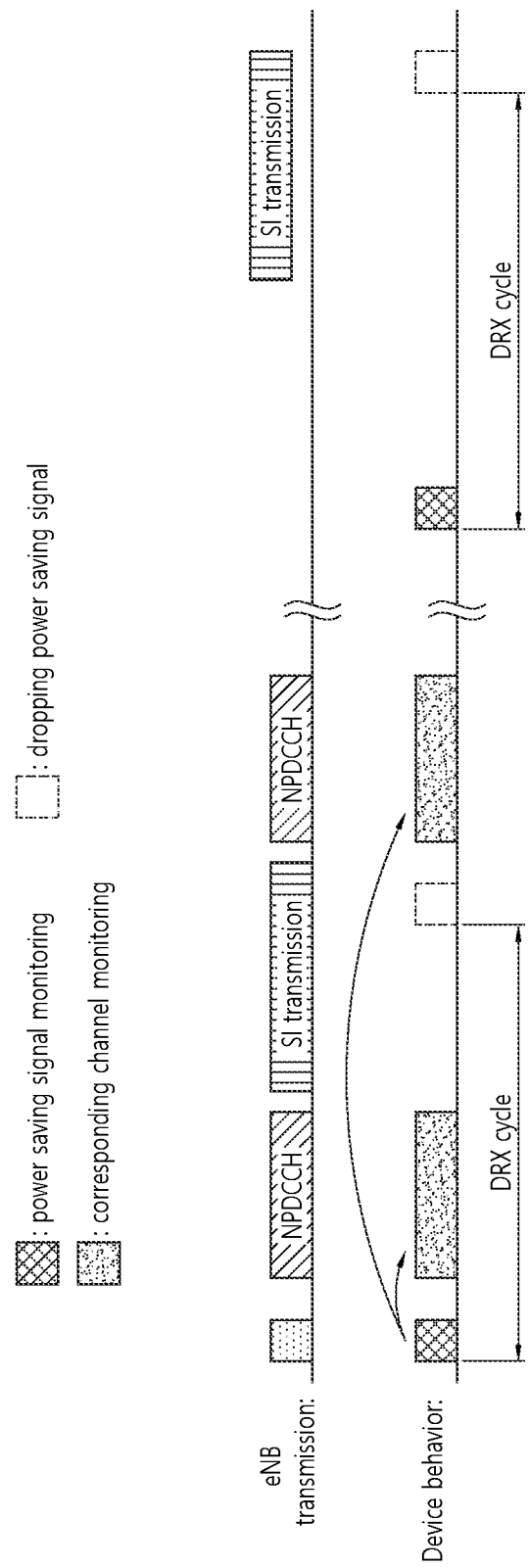
FIG. 16 is an exemplary diagram illustrating an operation of an NB-IoT device according to a fifth disclosure.

FIG. 16 is an exemplary diagram illustrating an operation of an NB-IoT device according to a fifth disclosure.

FIG. 16 illustrates an example in which if the transmission of a power saving signal (or WUS) is dropped at a specific location, a power saving signal (or WUS) at previous transmission timing indicates the transmissions of two subsequent corresponding channels.

VIII. Eighth Disclosure

The eighth disclosure proposes a method of using a power saving signal (or WUS) at specific timing to indicate whether to monitor a corresponding channel at next timing if the transmission of the corresponding channel corresponding to the power saving signal (or WUS) at the corresponding timing is dropped in the situation in which the power saving signal (or WUS) is used to notify whether to monitor the corresponding channel that is periodically transmitted.

In a specific situation, the transmission of a power saving signal (or WUS) is possible, but the transmission of a corresponding channel may be impossible. For example, in the case of NB-IoT in a current standard, if the transmission occasion of an NPDCCH for a paging object overlaps a subsequent another search space, previous NPDCCH transmission has been defined to be dropped. Accordingly, if a corresponding channel is dropped, unnecessary monitoring or the waste of resources for the transmission of the power saving signal (or WUS) may occur form the viewpoint of an NB-IoT device because a target to be indicated disappears.

In order to solve such a problem, as a simple method, if the transmission of a corresponding channel is dropped, an NB-IoT device may determine to not expect the transmission of a corresponding power saving signal (or WUS). This has an advantage in that the relation between a power saving signal (or WUS) and a corresponding channel can be always maintained uniformly, and has an advantage in that power consumption attributable to the monitoring of a power saving signal (or WUS) can be reduced if a corresponding channel is not present. However, there is a disadvantage in that whether to drop a corresponding channel needs to be previously calculated in a process for an NB-IoT device to infer the occasion of a power saving signal (or WUS). Furthermore, there is a disadvantage in that scheduling flexibility may be lost because the occasion of a transmittable power saving signal (or WUS) is forced to be dropped. In particular, if the transmission of a power saving signal (or WUS) corresponding to a subsequent corresponding channel is impossible, there is a disadvantage in that delay for the reception of the corresponding channel may be significantly increased.

In order to solve such a problem, this paragraph proposes a method of enabling a power saving signal (or WUS) at specific timing to indicate whether to monitor a corresponding channel at next timing if the transmission of the corresponding channel corresponding to the power saving signal (or WUS) at the corresponding timing is dropped. For example, it is assumed that in NB-IoT, an NPDCCH for a paging object is a corresponding channel and a paging occasion (PO) occurs in a period of T. In this case, a case where the transmission of the corresponding channel corresponding to the location of a specific paging occasion (PO) is postponed as an SIB transmission location and overlapped with the search space of a subsequent paging object and dropped may be taken into consideration. In this case, a power saving signal (or WUS) at the corresponding timing may be used for the purpose of indicating whether to transmit a subsequent NPDCCH for a paging object. If a power saving signal (or WUS) at a corresponding location is not present, an NB-IoT device may monitor a power saving signal (or WUS) at a next location.

Figure 17:
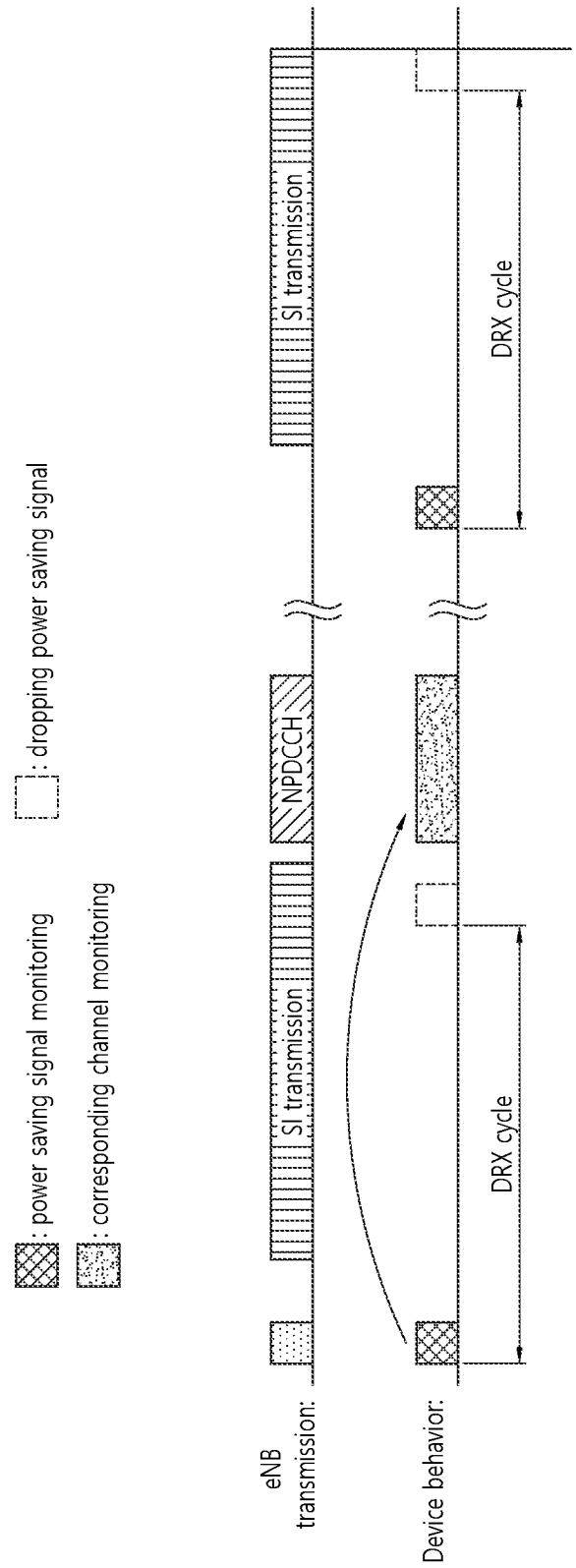
FIG. 17 is an exemplary diagram illustrating an operation of an NB-IoT device according to an eighth disclosure.

FIG. 17 is an exemplary diagram illustrating an operation of an NB-IoT device according to an eighth disclosure.

FIG. 17 illustrates an example in which if a corresponding channel at a specific location has been dropped, a corresponding power saving signal (or WUS) indicates the transmission of a subsequent corresponding channel.

IX. Ninth Disclosure

The ninth disclosure proposes a method for an NB-IoT device to drop the monitoring of a subsequent power saving signal (or WUS) if a corresponding channel whose transmission is indicated by a power saving signal (or WUS) at specific timing overlaps the transmission location of a subsequent power saving signal (or WUS) in the situation in which the power saving signal (or WUS) is used to notify whether to monitor a corresponding channel that is periodically transmitted. In this case, the NB-IoT device may perform the monitoring of a corresponding channel corresponding to the dropped power saving signal (or WUS).

Transmission timing of a corresponding channel indicated to be monitored by a power saving signal (or WUS) may be postponed for the purpose of guaranteeing the transmission of another signal or channel. For example, in the case of NB-IoT, the transmission location of NPDSCH transmission for a paging object may be postponed if NPDSCH transmission for an SI object is present. In such a case, there is a possibility that an NPDSCH transmission location for a paging object may overlap the transmission location of a subsequent power saving signal (or WUS). In such a case, an NB-IoT device may determine to preferentially perform NPDCCH monitoring for a paging object. However, in such a case, the transmission of a subsequent power saving signal (or WUS) is not guaranteed. There is a disadvantage in that a base station cannot indicate whether to transmit an NPDCCH for subsequent paging with respect to an NB-IoT device.

In order to solve such a problem, this paragraph proposes a method for an NB-IoT device to determine to perform the monitoring of a paging NPDCCH, corresponding to a power saving signal (or WUS) whose transmission has been dropped, without the indication of the power saving signal (or WUS) if a corresponding channel at specific timing overlaps the transmission location of a subsequent power saving signal (or WUS) and the transmission of the power saving signal (or WUS) has been dropped in the state in which the power saving signal (or WUS) at the corresponding timing indicates the transmission of a corresponding channel.

Figure 18:
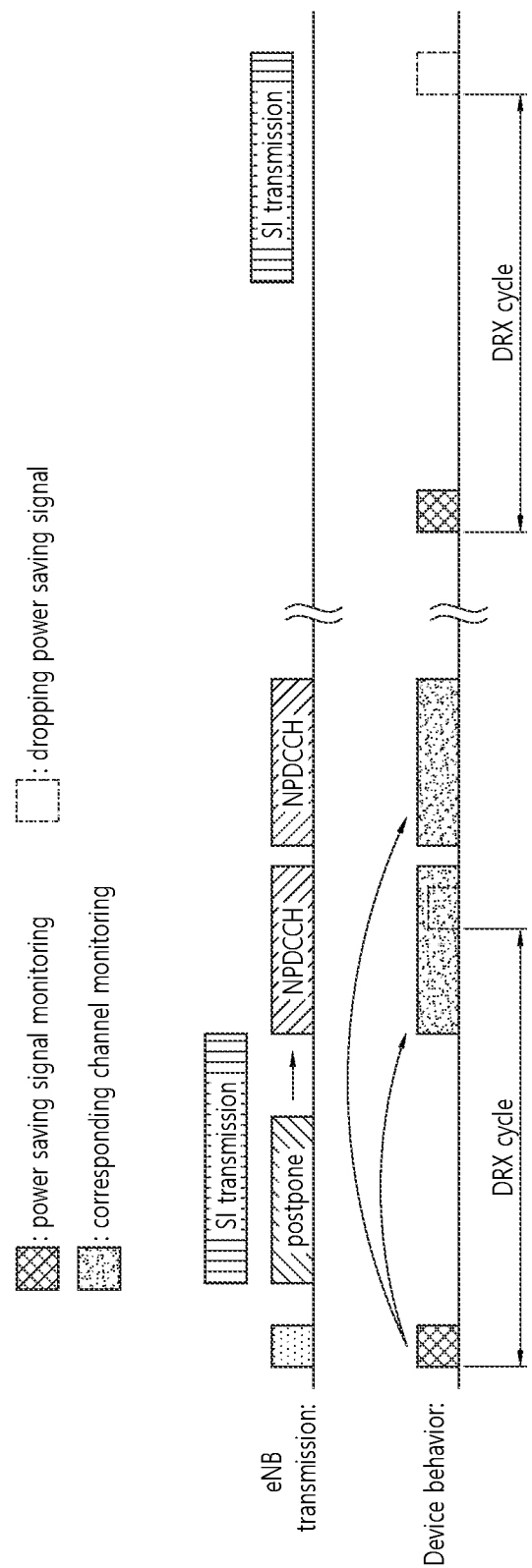
FIG. 18 is an exemplary diagram illustrating an operation of an NB-IoT device according to a ninth disclosure.

FIG. 18 is an exemplary diagram illustrating an operation of an NB-IoT device according to a ninth disclosure.

FIG. 18 illustrates a method of permitting the monitoring of a corresponding channel if a power saving signal (or WUS) at specific timing has been dropped by the transmission of a corresponding channel at previous timing.

X. Tenth Disclosure

The tenth disclosure proposes a method for an NB-IoT device to postpone the monitoring location of a subsequent power saving signal (or WUS) if a corresponding channel whose transmission is indicated by a power saving signal (or WUS) at specific timing overlaps the transmission location of the subsequent power saving signal (or WUS) in the situation in which the power saving signal (or WUS) is used to notify whether to monitor the corresponding channel that is periodically transmitted. In this case, a criterion to which the postponement is applied may be limited to a case where the transmittable number of subframes of the power saving signal (or WUS) is sufficient.

Transmission timing of the corresponding channel indicated to be monitored by the power saving signal (or WUS) may be postponed for the purpose of guaranteeing the transmission or another signal or channel. For example, in the case of NB-IoT, the transmission location of NPDSCH transmission for a paging object may be postponed if NPDSCH transmission for an SI object is present. In such a case, there is a possibility that the NPDSCH transmission location for a paging object may overlap the transmission location of a subsequent power saving signal (or WUS). In such a case, an NB-IoT device may determine to preferentially perform NPDCCH monitoring for a paging object. However, in such a case, the transmission of a subsequent power saving signal (or WUS) is not guaranteed. There is a disadvantage in that a base station cannot indicate whether to transmit an NPDCCH for subsequent paging with respect to an NB-IoT device.

In order to solve such a problem, this paragraph proposes a method of postponing the transmission of a power saving signal (or WUS) if a corresponding channel at specific timing overlaps the transmission location of a subsequent power saving signal (or WUS) in the state in which the power saving signal (or WUS) at the corresponding timing indicates the transmission of the corresponding channel.

The proposed method may be determined to be applied to only a case where the transmission length of a power saving signal (or WUS) has been sufficiently guaranteed at the location where the power saving signal (or WUS) has been postponed and to drop a power saving signal (or WUS) if not. In this case, the transmission length of the power saving signal (or WUS), that is, a criterion, may be a maximum power saving signal (or WUS) length set by a base station or may be a length obtained by multiplying a maximum power saving signal (or WUS) length by a specific scaling value. In this case, the number of subframes in which the power saving signal (or WUS) can be transmitted may be calculated based on an occasion from a corresponding channel from a subframe location at which a power saving signal (or WUS) is postponed and whose transmission is started to a specific minimum gap.

Figure 19:
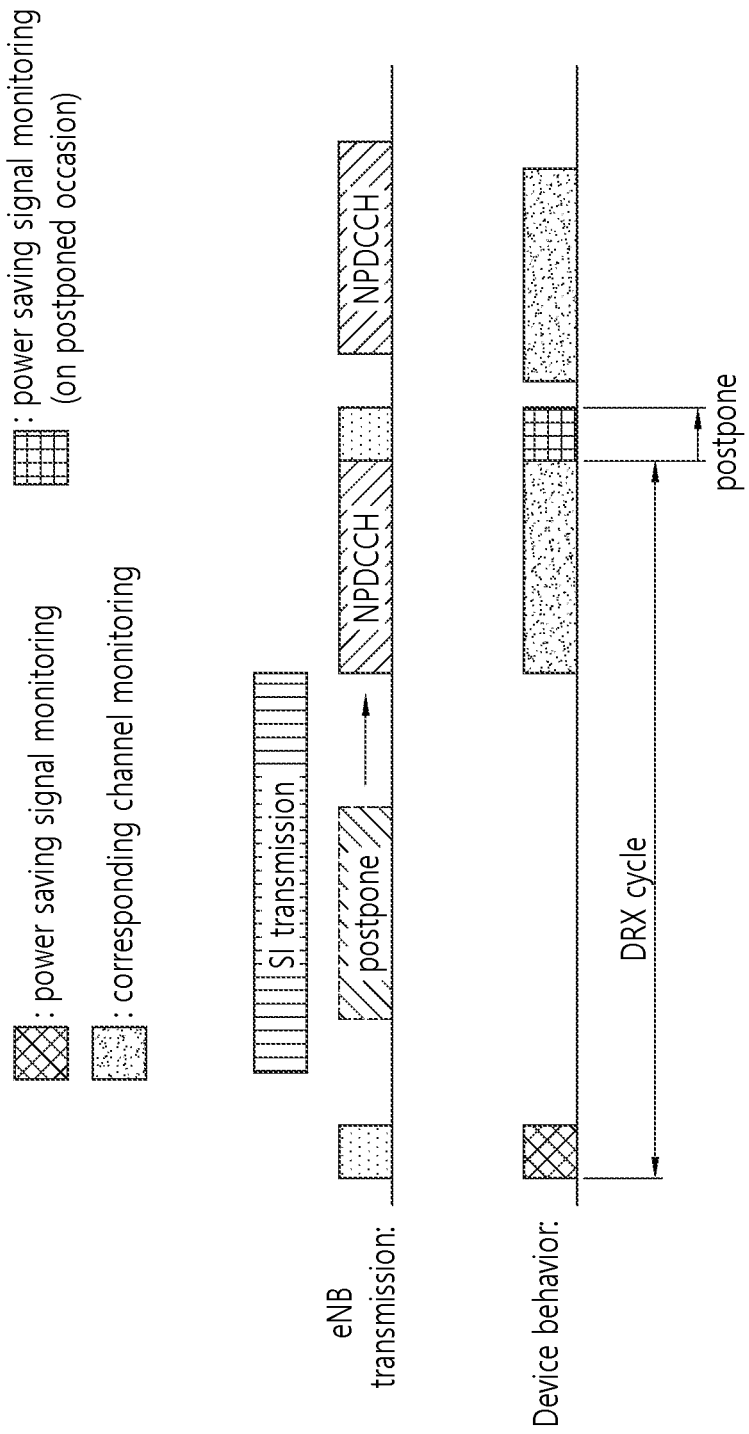
FIG. 19 is an exemplary diagram illustrating an operation of an NB-IoT device according to a tenth disclosure.

FIG. 19 is an exemplary diagram illustrating an operation of an NB-IoT device according to a tenth disclosure.

FIG. 19 illustrates an example of a case a power saving signal (or WUS) at specific timing is postponed by the transmission of a corresponding channel at previous timing.

XI. Eleventh Disclosure

From the viewpoint of a base station, the transmission location of a power saving signal (or WUS) may be present in plural number in order to notify whether to monitor a corresponding channel. However, an NB-IoT device may determine the location where a power saving signal (or WUS) will be monitored to be one based on its own capability. In this case, if the transmission of the power saving signal (or WUS) at the transmission location determined by the NB-IoT device is not suitable, the NB-IoT device may determine to reselect a suitable transmission location and to monitor a power saving signal (or WUS).

A base station supports the relative location of a power saving signal (or WUS) and a corresponding channel in various manners depending on various capabilities and operation methods of NB-IoT devices. For example, a case where the transmission location of a power saving signal (or WUS) may be determined depending on whether an NB-IoT device supports an eDRX mode and depending on the gap capability of an NB-IoT device is taken into consideration. In order to support an operation related to a power saving signal (or WUS) for the requirements of such various NB-IoT devices, a base station may support one or more power saving signal (or WUS) transmission locations for one corresponding channel. For example, an NB-IoT device may select one of gap sizes between channels corresponding to multiple power saving signals (or WUSs) configured by a base station based on whether an eDRX mode is supported and a gap capability, and may apply the selected one.

However, the selected transmission location of the power saving signal (or WUS) may not be suitable in a specific situation. For example, if the transmission location of a power saving signal (or WUS) overlaps the transmission location of a signal or channel having relatively high priority, such as SIB transmission, the transmission of the power saving signal (or WUS) at the corresponding location may be dropped fully or at a given ratio or more. In this case, there is a limit in monitoring a corresponding channel using the power saving signal (or WUS).

In order to overcome such a problem, this paragraph proposes a method of determining, by an NB-IoT device, to select and monitor the transmission location of a power saving signal (or WUS) suitable for transmission among a plurality of power saving signal (or WUS) transmission locations. In this case, the transmission location of the power saving signal (or WUS) suitable for transmission denotes a case where the transmission of a power saving signal (or WUS) is X % or more (or Y subframe and/or Z PRBs or more) of a time/frequency resource length capable of being fully transmitted. If a power saving signal (or WUS) transmission location suitable for the existing rule (e.g., whether to operate an eDRX mode and a selection rule based on the gap capability of an NB-IoT device) is included in a location suitable for the transmission of the power saving signal (or WUS), the NB-IoT device preferentially selects and determines the power saving signal (or WUS) transmission location. If the transmission location of the power saving signal (or WUS) suitable for the existing rule is not included in the location suitable for the transmission of the power saving signal (or WUS), the NB-IoT device (1) may determine to select the transmission location of the closest power saving signal (or WUS) based on the existing rule or (2) may determine to select the transmission location of a power saving signal (or WUS) more adjacent to a corresponding channel compared to the transmission location of a power saving signal (or WUS) selected based on the existing rule.

Figure 20:
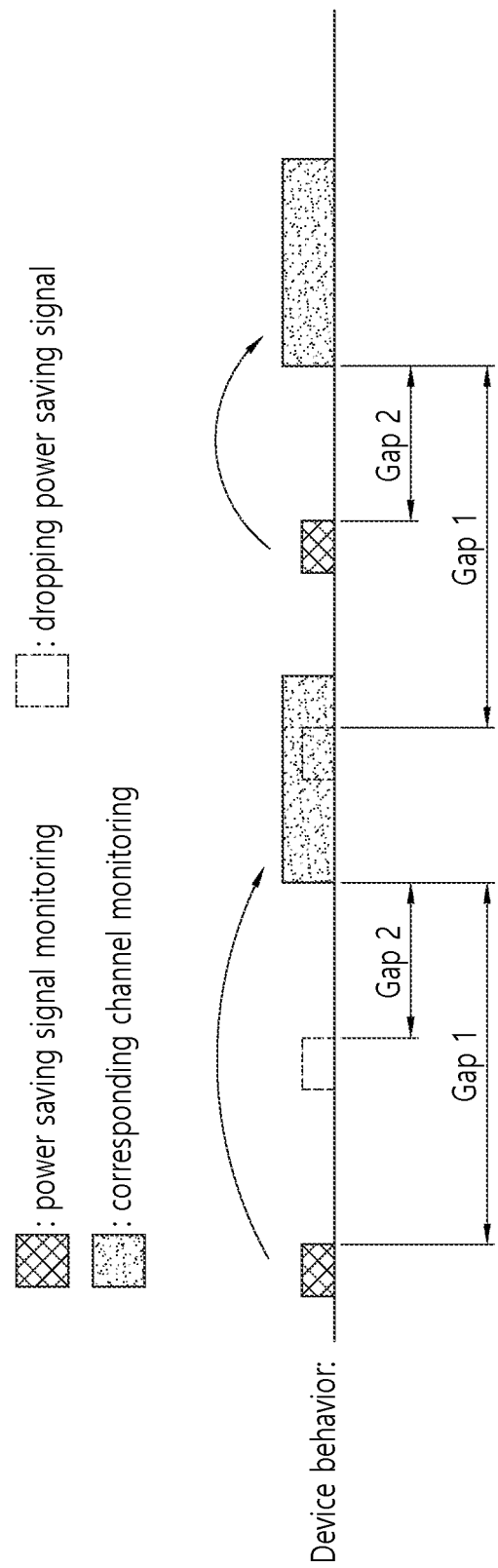
FIG. 20 is an exemplary diagram illustrating an operation of an NB-IoT device according to an eleventh disclosure.

FIG. 20 is an exemplary diagram illustrating an operation of an NB-IoT device according to an eleventh disclosure.

In the example illustrated in FIG. 20, a case where an NB-IoT device has the capability of a gap 1 is assumed. In this case, the NB-IoT device operates to first determine, as the monitoring location of a power saving signal (or WUS), a power saving signal (or WUS) location whose transmission location is determined according to the gap 1, and second select a gap 2, if not. If both the gap 1 and the gap 2 are not suitable for transmission, the NB-IoT device may operate according to a method based on any one of the seventh disclosure to the tenth disclosure.

The embodiment of the present disclosure described so far may be implemented through various means. For example, the embodiments of the present disclosure may be implemented by hardware, firmware, software or a combination of them. This is specifically described with reference the drawing.

Figure 21:
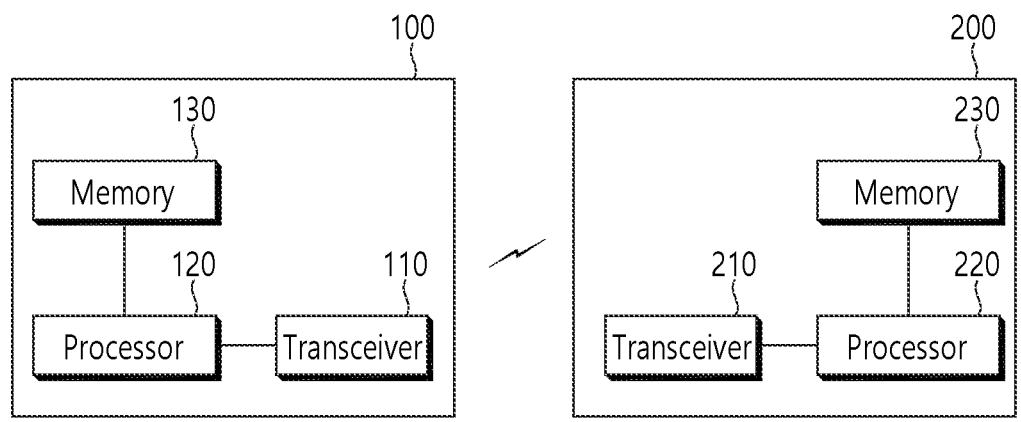
FIG. 21 is a block diagram illustrating a wireless device and base station in which a disclosure of this specification is implemented.

FIG. 21 is a block diagram illustrating a wireless device and a base station to implement the disclosures of the present specification.

Referring to FIG. 21, the wireless device 100 and the base station may implement the disclosures of the present specification.

The wireless device 100 includes a processor 101, a memory 102, and a transceiver 103. Likewise, the base station 200 includes a processor 201, a memory 202, and a transceiver 203. The processors 101 and 201, the memories 102 and 202, and the transceivers 103 and 203 may each be configured as a separate chip, or at least two blocks/functions may be configured as a single chip.

The transceivers 103 and 203 include a transmitter and a receiver. When a particular operation is performed, only one of the transmitter and the receiver may operate, or both the transmitter and the receiver may operate. The transceivers 103 and 203 may include one or more antennas to transmit and/or receive a radio signal. Further, the transceivers 103 and 203 may include an amplifier to amplify a reception signal and/or a transmission signal and a band pass filter for transmission on a particular frequency band.

The processors 101 and 201 may implement the functions, processes, and/or methods proposed in the present specification. The processors 101 and 201 may include an encoder and a decoder. For example, the processors 101 and 201 may operate according to the foregoing description. The processors 101 and 201 include an application-specific integrated circuit (ASIC), a separate chipset, a logic circuit, a data processor, and/or a converter to convert a baseband signal and a radio signal from one to the other.

The memories 102 and 202 may include a read-only memory (ROM), a random access memory (RAM), a flash memory, a memory card, a storage medium, and/or other storage devices.

Figure 22:
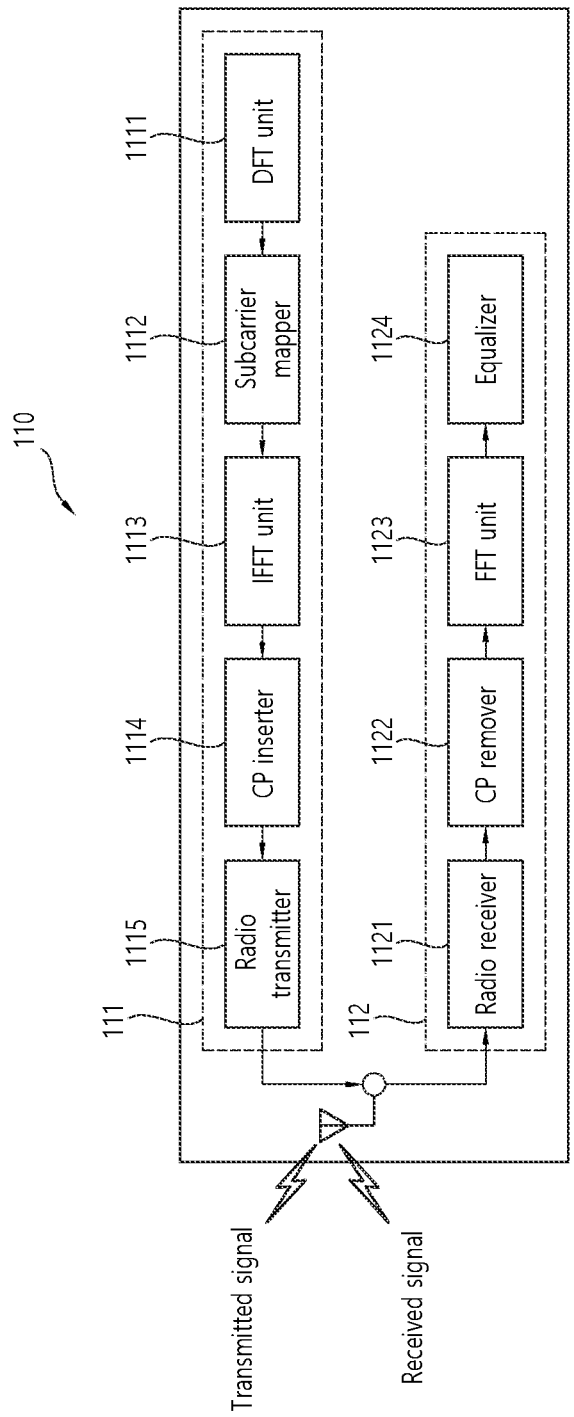
FIG. 22 is a detailed block diagram of the transceiver of the wireless device illustrated in FIG. 20.

FIG. 22 is a block diagram specifically illustrating the transceiver of the wireless device illustrated in FIG. 21.

Referring to FIG. 22, the transceiver 110 includes a transmitter 111 and a receiver 112. The transmitter 111 includes a discrete Fourier transform (DFT) unit 1111, a subcarrier mapper 1112, an IFFT unit 1113, a CP inserter 1144, a radio transmitter 1115. The transmitter 111 may further include a modulator. Also, for example, the transmitter 111 may further include a scramble unit (not shown), a modulation mapper (not shown), a layer mapper (not shown), and a layer permutator (not shown), and these elements may be positioned before the DFT unit 1111. That is, in order to prevent an increase in the peak-to-average power ratio (PAPR), the transmitter 111 allows information to pass through the DFT unit 1111 before mapping a signal to a subcarrier. After performing subcarrier mapping of a signal, which is spread (or precoded, in the same sense) by the DFT unit 1111, through the subcarrier mapper 1112, the signal passes through the inverse fast Fourier transform (IFFT) unit 1113 into a signal on a time axis.

The DFT unit 1111 performs DFT on inputted symbols, thereby outputting complex-valued symbols. For example, when Ntx symbols are inputted (where Ntx is a natural number), a DFT size is equal to Ntx. The DFT unit 1111 may also be referred to as a transform precoder. The subcarrier mapper 1112 maps the complex-valued symbols to each subcarrier in the frequency domain. The complex-valued symbols may be mapped to resource elements corresponding to a resource block being assigned for data transmission. The subcarrier mapper 1112 may also be referred to as a resource element mapper. The IFFT unit 1113 performs IFFT on the inputted symbols, thereby outputting a baseband signal for data, which corresponds to a time-domain signal. The CP inserter 1114 duplicates an end part of the baseband signal for the data and inserts the duplicated part to a front part of the baseband signal for the data. By performing CP insertion, inter-symbol interference (ISI) and inter-carrier interference (ICI) may be prevented, thereby allowing orthogonality to be maintained even in a multi-path channel.

The receiver 112 includes a radio receiver 1121, a CP remover 1122, an FFT unit 1123, and an equalizer 1124. The radio receiver 1121, the CP remover 1122, and the FFT unit 1123 of the receiver 112 respectively perform the inverse functions of the radio transmitter 1115, the CP inserter 1114, and the IFFT unit 1113 of the transmitter 111. The receiver 112 may further include a demodulator.

What is claimed is:

1. A method for monitoring a signal, the method performed by a wireless communication device and comprising:
    receiving configuration information informing a monitoring occasion for detecting a wake up signal (WUS),
    wherein the monitoring occasion is related to discontinuous reception (DRX) cycle, and
    wherein a first monitoring for detecting the WUS is not required based on a resource of the monitoring occasion overlapping a resource for a synchronization signal.

2. The method of claim 1, based on a first monitoring for detecting the WUS not being required, performing a second monitoring for detecting the WUS in a next monitoring occasion.

3. The method of claim 1, wherein the configuration information includes information for an expiration timer.

4. The method of claim 3, further comprising:
    driving the expiration timer.

5. The method of claim 4, further comprising subsequently monitoring a downlink channel or downlink signal, based on the WUS not being received until the expiration timer expires.

6. The method of claim 4, wherein the expiration timer is initiated in relation to a release of a radio resource control (RRC) connection.

7. The method of claim 6, wherein the release of the RRC connection is performed based on a reception of a downlink control channel or a downlink data channel.

8. The method of claim 6, wherein the release of the RRC connection is performed based on a transmission of an uplink control channel or an uplink data channel.

9. A wireless communication device configured to monitor a signal, the wireless communication device comprising:
    at least one transceiver;
    at least one processor; and
    at least one computer memory operably connected to the at least one processor and storing instructions that, based on being executed by the at least one processor, perform operations comprising:
    receiving configuration information informing a monitoring occasion for detecting a wake up signal (WUS),
    wherein the monitoring occasion is related to discontinuous reception (DRX) cycle, and
    wherein a first monitoring for detecting the WUS is not required based on a resource of the monitoring occasion overlapping a resource for a synchronization signal.

10. The wireless communication device of claim 9, based on a first monitoring for detecting the WUS not being required, performing a second monitoring for detecting the WUS in a next monitoring occasion.

11. The wireless communication device of claim 9, wherein the configuration information includes information for an expiration timer.

12. The wireless communication device of claim 11, wherein the operations further comprise: driving the expiration timer.

13. The wireless communication device of claim 12, wherein the operations further comprise: subsequently monitoring a downlink channel or downlink signal, based on the WUS not being received until the expiration timer expires.

14. At least one computer memory operably connected to at least one processor and storing instructions that, based on being executed by the at least one processor, control a device to perform operations comprising:
    receiving configuration information informing a monitoring occasion for detecting a wake up signal (WUS),
    wherein the monitoring occasion is related to discontinuous reception (DRX) cycle, and
    wherein a first monitoring for detecting the WUS is not required based on a resource of the monitoring occasion overlapping a resource for a synchronization signal.

15. The at least one computer memory of claim 14, based on a first monitoring for detecting the WUS not being required, performing a second monitoring for detecting the WUS in a next monitoring occasion.

16. The at least one computer memory of claim 14, wherein the configuration information includes information for an expiration timer.

17. The at least one computer memory of claim 16, wherein the operations further comprise: driving the expiration timer.

18. The at least one computer memory of claim 17, wherein the operations further comprise: subsequently monitoring a downlink channel or downlink signal, based on the WUS not being received until the expiration timer expires.

* * * * *